(12) United States Patent
Fukasawa et al.

(10) Patent No.: US 11,212,402 B2
(45) Date of Patent: Dec. 28, 2021

(54) MEDIUM TRANSPORTING APPARATUS, IMAGE READING APPARATUS, AND METHOD FOR DETECTING MEDIUM BY MEDIUM TRANSPORTING APPARATUS

(71) Applicant: SEIKO EPSON CORPORATION, Tokyo (JP)

(72) Inventors: Yusuke Fukasawa, Kitakyushu (JP); Hidetoshi Masuda, Kitakyushu (JP); Yasunori Fukumitsu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/005,849

(22) Filed: Aug. 28, 2020

(65) Prior Publication Data
US 2021/0067644 A1  Mar. 4, 2021

(30) Foreign Application Priority Data

Aug. 30, 2019  (JP) .............................. JP2019-157795

(51) Int. Cl.
*H04N 1/00* (2006.01)
*B65H 7/06* (2006.01)

(52) U.S. Cl.
CPC ........... *H04N 1/00602* (2013.01); *B65H 7/06* (2013.01); *H04N 1/00729* (2013.01)

(58) Field of Classification Search
CPC .......... B65H 2511/20; B65H 2511/214; B65H 2511/242; B65H 2511/51; B65H 2511/515; B65H 2515/716; B65H 2553/20; B65H 3/06; B65H 7/02; B65H 7/06; H04N 1/00602; H04N 1/00729; H04N 1/00885; H04N 1/00896; H04N 1/00901; H04N 2201/0091; G03G 15/30; G03G 15/1605; G03G 15/1695; G03G 15/18; G03G 15/70; G03G 21/1623; G03G 21/1647; G03G 21/1864; G03G 2215/0174; G03G 2215/1614; G03G 2221/1603; G03G 2221/1609; G03G 2221/1615; G03G 2221/163; G03G 2221/1654;

(Continued)

(56) References Cited

U.S. PATENT DOCUMENTS 5,473,352 A * 12/1995 Ishida .................... B41J 2/4155
                                                          347/153
8,190,040 B2 * 5/2012 Mimura ............. G03G 15/0877
                                                          399/12

(Continued)

FOREIGN PATENT DOCUMENTS

JP    2017-188542 A    10/2017
JP    2019-029816 A    2/2019

(Continued)

*Primary Examiner* — Negussie Worku
(74) *Attorney, Agent, or Firm* — Workman Nydegger

(57) ABSTRACT

A medium transporting apparatus includes a feeding roller that rotates to transport a medium along a transportation path, an electrode installed downstream of the feeding roller on the transportation path and having conductivity, and an electric charge detecting circuit that outputs a signal having a magnitude corresponding to an amount of an electric charge, which moves from the medium to the electrode after the medium being transported along the transportation path comes into contact with the electrode.

11 Claims, 16 Drawing Sheets

(58) Field of Classification Search
CPC ... G03G 2221/1657; G03G 2221/1672; G03G 2221/1675; G03G 2221/169; G03G 2221/183; G03G 2221/1853; B41J 2/45; H01L 35/30; H01M 10/0525; H01M 10/441; H01M 10/46; H01M 10/482; H01M 10/667; H01M 16/00; H02J 1/10; H02J 7/0042; H02J 7/34; Y02E 60/10
USPC .................................................. 358/498, 497
See application file for complete search history.

(56) References Cited

U.S. PATENT DOCUMENTS

| | | | | |
|---|---|---|---|---|
| 8,498,025 | B2* | 7/2013 | Fukasawa | H04N 1/0057 358/474 |
| 10,140,799 | B2 | 11/2018 | Chang et al. | |
| 2004/0091823 | A1* | 5/2004 | Kojima | G03C 1/49881 430/350 |
| 2007/0235922 | A1* | 10/2007 | Tonami | B65H 7/125 271/262 |
| 2009/0033993 | A1* | 2/2009 | Nakazato | G06F 3/1218 358/1.15 |
| 2010/0092196 | A1* | 4/2010 | Mimura | G03G 15/0886 399/55 |
| 2010/0157385 | A1* | 6/2010 | Fukasawa | H04N 1/0057 358/474 |
| 2016/0001580 | A1* | 1/2016 | Willems | B41M 5/0011 347/101 |
| 2016/0052302 | A1* | 2/2016 | Willems | C09D 11/322 347/101 |
| 2019/0037092 | A1* | 1/2019 | Shiota | H04N 1/0074 |
| 2020/0191618 | A1* | 6/2020 | Yamada | G01D 11/245 |
| 2021/0068240 | A1* | 3/2021 | Takamatsu | H04N 1/00801 |

FOREIGN PATENT DOCUMENTS

| | | |
|---|---|---|
| JP | 2021-036637 | 3/2021 |
| JP | 2021-036639 | 3/2021 |

* cited by examiner

MEDIUM TRANSPORTING APPARATUS, IMAGE READING APPARATUS, AND METHOD FOR DETECTING MEDIUM BY MEDIUM TRANSPORTING APPARATUS

The present application is based on, and claims priority from JP Application Serial Number 2019-157795, filed Aug. 30, 2019, the disclosure of which is hereby incorporated by reference herein in its entirety.

BACKGROUND

1. Technical Field

The present disclosure relates to a medium transporting apparatus that transports a medium along a transportation path, an image reading apparatus having the medium transporting apparatus, and a method for detecting a medium by the medium transporting apparatus.

2. Related Art

JP-A-2017-188542 describes an example of an image reading apparatus that reads an image of a medium by means of a reader and generates image data based on the image while transporting the medium along a transportation path. In the image reading apparatus, an optical sensor that detects a medium is installed upstream of the reader above the transportation path.

In general, the optical sensor includes a light emitter and a light receiver for receiving light output from the light emitter. When the transported medium reaches a position where the optical sensor is installed, the light from the light emitter is blocked by the medium. As a result, the amount of the light received by the light receiver is reduced. A change in the amount of the light received by the light receiver is used to detect the medium. Therefore, when the optical sensor that includes the light emitter and the light receiver is installed above the transportation path, the configuration of the apparatus is complex.

Such a problem occurs in an apparatus other than the image reading apparatus as long as the apparatus transports a medium along a transportation path.

SUMMARY

According to an aspect of the disclosure, a medium transporting apparatus that solves the foregoing problem transports a medium along a transportation path. The medium transporting apparatus includes a feeding roller that rotates to transport the medium, an electrode installed downstream of the feeding roller on the transportation path and having conductivity, and an electric charge detecting circuit that outputs a signal having a magnitude corresponding to an amount of an electric charge, which moves from the medium to the electrode after the medium being transported along the transportation path comes into contact with the electrode.

According to another aspect of the disclosure, an image reading apparatus that solves the foregoing problem includes the foregoing medium transporting apparatus and a reader that reads an image of the medium transported along the transportation path.

According to still another aspect of the disclosure, an image reading apparatus that solves the foregoing problem includes the foregoing medium transporting apparatus and a reader that reads an image of the medium transported along the transportation path, and the controller of the medium transporting apparatus cancels transportation of the medium when the estimated value of the inclination is equal to or larger than an inclination determination value.

According to still another aspect of the disclosure, a method for detecting a medium by a medium transporting apparatus that solves the foregoing problem is provided. The medium transporting apparatus includes a feeding roller that rotates to transport the medium, an electrode installed downstream of the feeding roller on the transportation path and having conductivity, and an electric charge detecting circuit that outputs a signal having a magnitude corresponding to an amount of an electric charge, which moves from the medium to the electrode after the medium being transported along the transportation path comes into contact with the electrode. The method for detecting the medium includes causing a controller of the medium transporting apparatus to determine that the medium is in contact with the electrode when the medium is transported along the transportation path from upstream to downstream in a transportation direction and a magnitude of a signal output from the electric charge detecting circuit is equal to or larger than a detection determination value.

DESCRIPTION OF EXEMPLARY EMBODIMENTS

First Embodiment

Hereinafter, a first embodiment of a medium transporting apparatus, an image reading apparatus, and a method for detecting a medium by the medium transporting apparatus is described in accordance with FIGS. 1 to 7.

Figure 1:
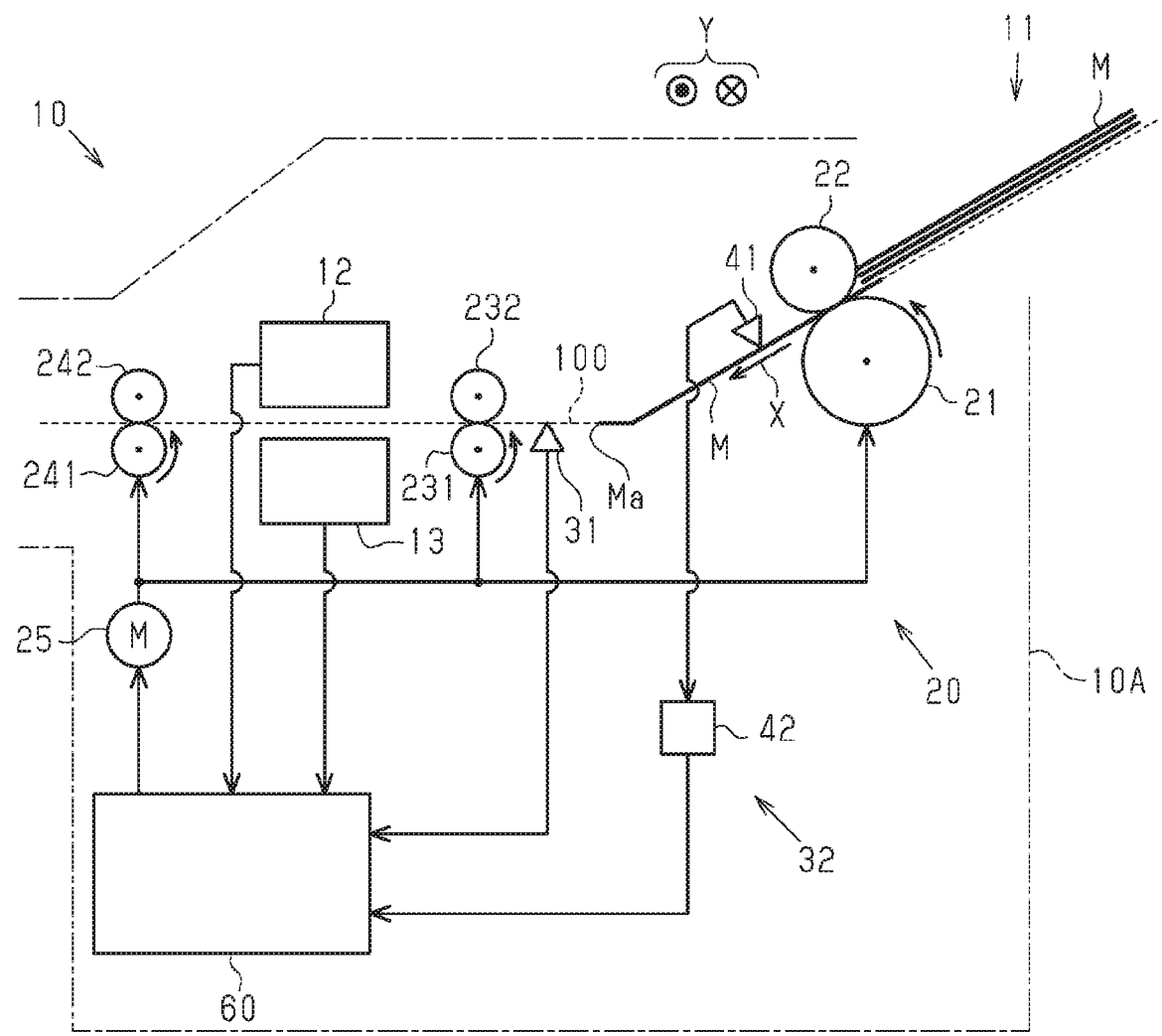
FIG. 1 is a side view schematically illustrating an image reading apparatus according to a first embodiment.

As illustrated in FIG. 1, an image reading apparatus 10 according to the first embodiment includes a casing 10A, a medium holder 11 that holds media M stacked, and a medium transporting apparatus 20 that transports each of the media M held by the medium holder 11 along a transportation path 100. The medium transporting apparatus 20 is installed in the casing 10A. Each of the media M is, for example, an insulating paper sheet or the like.

The image reading apparatus 10 also includes a reader that reads an image of the medium M transported along the transportation path 100. In an example illustrated in FIG. 1, the image reading apparatus 10 includes, as the reader, a first reader 12 and a second reader 13. The first reader 12 reads an image of a front surface of the medium M and the second reader 13 reads an image of a back surface of the medium M.

The medium transporting apparatus 20 includes a feeding roller 21 and a nip section 22. The feeding roller 21 feeds each of the media M held by the medium holder 11 toward the readers 12 and 13. The nip section 22 nips each of the media M together with the feeding roller 21. Examples of the nip section 22 are a separation roller and a separation plate. When the separation roller is used as the nip section 22, the rotation of the separation roller may be controlled or the separation roller may be rotated in a direction opposite to a rotational direction in which the separation roller rotates to transport the medium M toward a downward side X in a transportation direction.

In the medium transporting apparatus 20 according to the first embodiment, the medium M is nipped by the feeding roller 21 and the nip section 22 and fed by the rotation of the feeding roller 21 toward the downward side X in the transportation direction. In this case, the medium M rubs against the feeding roller 21 and the nip section 22. Therefore, static electricity is generated between the medium M and the feeding roller 21 and between the medium M and the nip section 22. As a result, electric charges are accumulated on both the front and back surfaces of the medium M.

The medium transporting apparatus 20 includes transport rollers 231 and 232 and discharge rollers 241 and 242. The transport rollers 231 and 232 are installed between the feeding roller 21 and the readers 12 and 13 in the transportation direction of the medium M. The discharge rollers 241 and 242 are installed downstream (as indicated by X) of the readers 12 and 13 in the transportation direction.

The medium transporting apparatus 20 includes a driving motor 25. The driving motor 25 serves as a power source for the feeding roller 21, the transport roller 231, and the discharge roller 241. When output of the driving motor 25 is transmitted to the feeding roller 21, the transport roller 231, and the discharge roller 241, the feeding roller 21, the transport rollers 231 and 232, and the discharge rollers 241 and 242 rotate and the medium M is transported along the transportation path 100 from upstream to downstream in the transportation direction.

The medium transporting apparatus 20 according to the first embodiment includes a plurality of detection sensors 31 and 32 that detect the medium M transported along the transportation path 100 from upstream to downstream in the transportation direction. The detection sensor 31 is installed upstream of the transport rollers 231 and 232 in the transportation direction. The detection sensor 31 detects a front end Ma of the medium M. When the front end Ma of the medium M is detected by the detection sensor 31, the readers 12 and 13 start reading images of the medium M.

Figure 2:
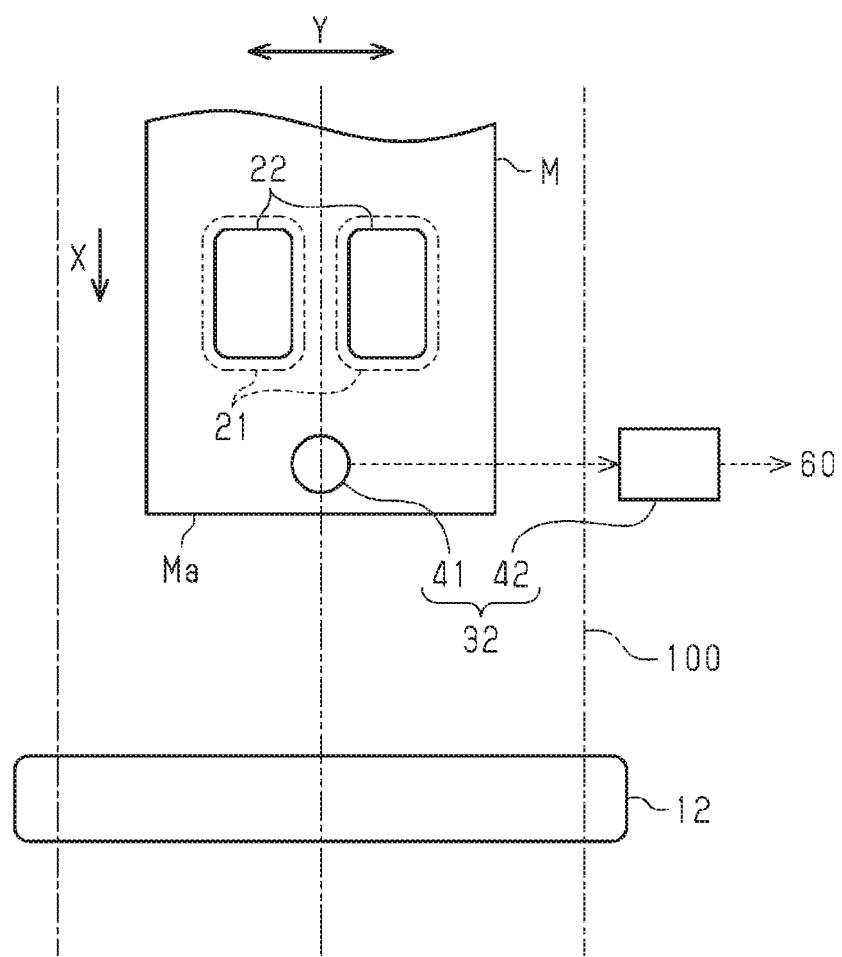
FIG. 2 is a plan view schematically illustrating a portion of the image reading apparatus.

As illustrated in FIGS. 1 and 2, the electrostatic detection sensor 32 includes an electrode 41 and an electric charge detecting circuit 42. The electrode 41 is installed between the nip section 22 and the detection sensor 31 in the transportation direction. The electric charge detecting circuit 42 is coupled to the electrode 41. When a width direction of the medium M transported along the transportation path 100 is a width direction Y, the electrode 41 is, for example, installed at the center of the transportation path 100 in the width direction Y. An alternate long and two short dashes line illustrated in FIG. 2 corresponds to the center of the transportation path 100 in the width direction Y.

Figure 3:
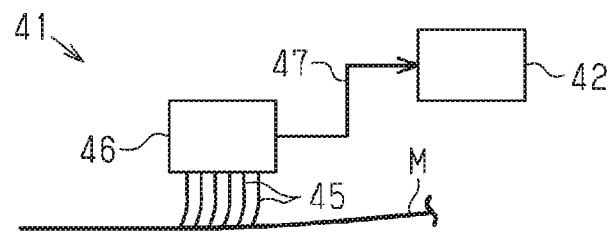
FIG. 3 is a schematic diagram illustrating an example of an electrostatic detection sensor of the image reading apparatus.

An example of the electrode 41 is a brush-shaped electrode illustrated in FIG. 3. In this case, the electrode 41 includes a plurality of fibers 45 and a base 46 to which base ends of the fibers 45 are fixed. Each of the fibers 45 is composed of a conductive material. Specifically, the electrode 41 has conductivity. Therefore, when the fibers 45 contact the medium M, an electric charge adhering to the medium M moves to the electrode 41. Then, the electric charge that moved to the electrode 41 moves toward the electric charge detecting circuit 42 via a wiring 47.

Figure 4:
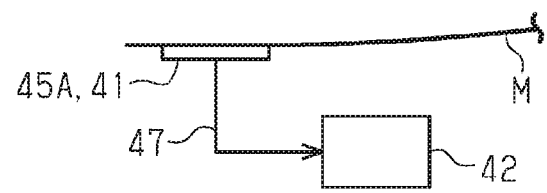
FIG. 4 is a schematic diagram illustrating an example of the electrostatic detection sensor of the image reading apparatus.

The electrode 41 may be a plate-shaped conductive plate 45A illustrated in FIG. 4, for example. Even in this case, the electrode 41 has conductivity. Therefore, when the medium M contacts the conductive plate 45A, an electric charge adhering to the medium M moves to the conductive plate 45A. Then, the electric charge that moved to the conductive plate 45A moves toward the electric charge detecting circuit 42 via the wiring 47.

Figure 5:
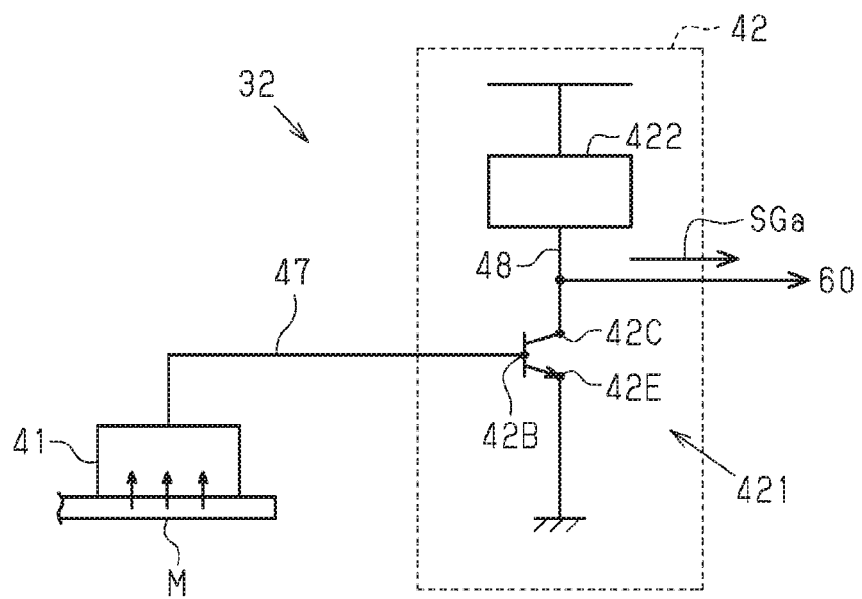
FIG. 5 is a block diagram illustrating an electric charge detecting circuit for the electrostatic detection sensor.

An example of the electric charge detecting circuit 42 is an emitter ground circuit illustrated in FIG. 5. In FIG. 5, arrows pointing from the medium M toward the electrode 41 indicate movements of electric charges from the medium M to the electrode 41.

The electric charge detecting circuit 42 illustrated in FIG. 5 includes a bipolar transistor 421. The electrode 41 is coupled to a base 42B of the bipolar transistor 421. An emitter 42E of the bipolar transistor 421 is grounded. A resistor 422 is coupled to a collector 42C of the bipolar transistor 421 via a wiring 48. A controller 60 is coupled to the wiring 48 located between the collector 42C and the resistor 422. Specifically, a signal having a magnitude corresponding to the amount of an electric charge that moved from the medium M to the electrode 41 is input to the base 42B of the bipolar transistor 421. Then, an amplified signal SGa obtained by amplifying the signal input to the base 42B is output from the collector 42C of the bipolar transistor 421 to the controller 60. The controller 60 includes a CPU and a memory.

Next, the flow of a process to be executed by the controller 60 in the transportation of the medium M is described with reference to FIG. 6. A series of processes illustrated in FIG. 6 correspond to a method for detecting a medium by the medium transporting apparatus 20. The processes illustrated in FIG. 6 are executed by the controller 60.

Figure 6:
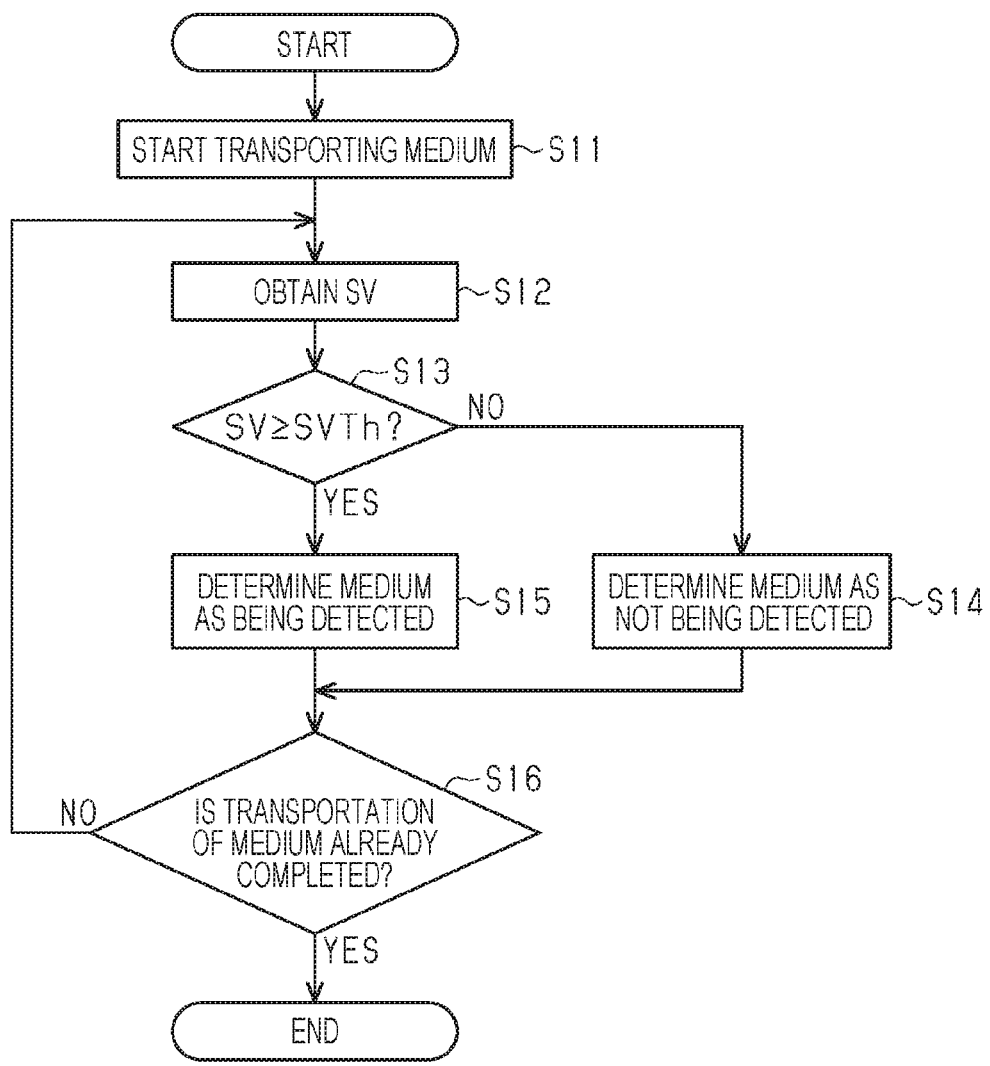
FIG. 6 is a flowchart illustrating the flow of a process to be executed by a controller of the image reading apparatus.

As illustrated in FIG. 6, in the first step S11, the transportation of the medium M is started. Specifically, the driving of the driving motor 25 is started. Then, the feeding roller 21, the transport rollers 231 and 232, and the discharge rollers 241 and 242 are started to rotate. By the rotation, the medium M is transported along the transportation path 100 at a constant transportation speed from upstream to downstream in the transportation direction.

In the next step S12, a signal value SV that indicates the magnitude of the amplified signal SGa input to the controller 60 from the electric charge detecting circuit 42 is obtained. As the amount of the electric charge that moved from the medium M to the electrode 41 is larger, the signal value SV is larger.

Then, in step S13, whether the obtained signal value SV is equal to or larger than a determination signal value SVTh is determined. As the determination signal value SVTh, a value to be used to determine, based on the magnitude of the signal value SV, whether the medium M is in contact with the electrode 41 is set. Specifically, when the signal value SV is smaller than the determination signal value SVTh, the medium M is not in contact with the electrode 41. On the other hand, when the signal value SV is equal to or larger than the determination signal value SVTh, the medium M is in contact with the electrode 41. When the signal value SV is smaller than the determination signal value SVTh (NO in step S13), the process proceeds to the next step S14. In step S14, the medium M is determined as not being detected by the electrode 41. Then, the process proceeds to step S16 described later.

When the signal value SV is equal to or larger than the determination signal value SVTh (YES in step S13), the process proceeds to the next step S15. In step S15, the medium M is determined as being detected by the electrode 41. Therefore, in the first embodiment, steps S13 and S15 are executed to determine that the medium M is in contact with the electrode 41 when the medium M is transported along the transportation path 100 from upstream to downstream in the transportation direction and the signal value SV that indicates the magnitude of the amplified signal SGa output from the electric charge detecting circuit 42 is equal to or larger than the determination signal value SVTh. Then, the process proceeds to the next step S16.

In step S16, whether the transportation of the medium M is already completed is determined. For example, when the reading of images of the medium M is completed by the readers 12 and 13 and the medium M is discharged from the transportation path 100, the transportation of the medium M is determined as being already completed. When the transportation of the medium M is not completed (NO in step S16), the process proceeds to the foregoing step S12. On the other hand, when the transportation of the medium M is already completed (YES in step S16), the series of processes illustrated in FIG. 6 are terminated.

Effects of the first embodiment are described with reference to FIG. 7.

When the feeding roller 21, the transport rollers 231 and 232, and the discharge rollers 241 and 242 are started to rotate, one medium M is transported from the medium holder 11 along the transportation path 100 from upstream to downstream in the transportation direction. In this case, when the front end Ma of the medium M passes through the electrode 41, the medium M contacts the electrode 41.

In the transportation of the medium M, static electricity is generated between the medium M and the feeding roller 21 and between the medium M and the nip section 22. Therefore, electric charges are accumulated on front and back surfaces of the medium M.

When the electrode 41 contacts the medium M, an electric charge moves from the medium M to the electrode 41. The electric charge that moved to the electrode 41 moves to the electric charge detecting circuit 42. As a result, the amplified signal SGa having a magnitude corresponding to the amount of the electric charge input to the electric charge detecting circuit 42 is generated in the electric charge detecting circuit 42 and input to the controller 60 from the electric charge detecting circuit 42.

Figure 7:
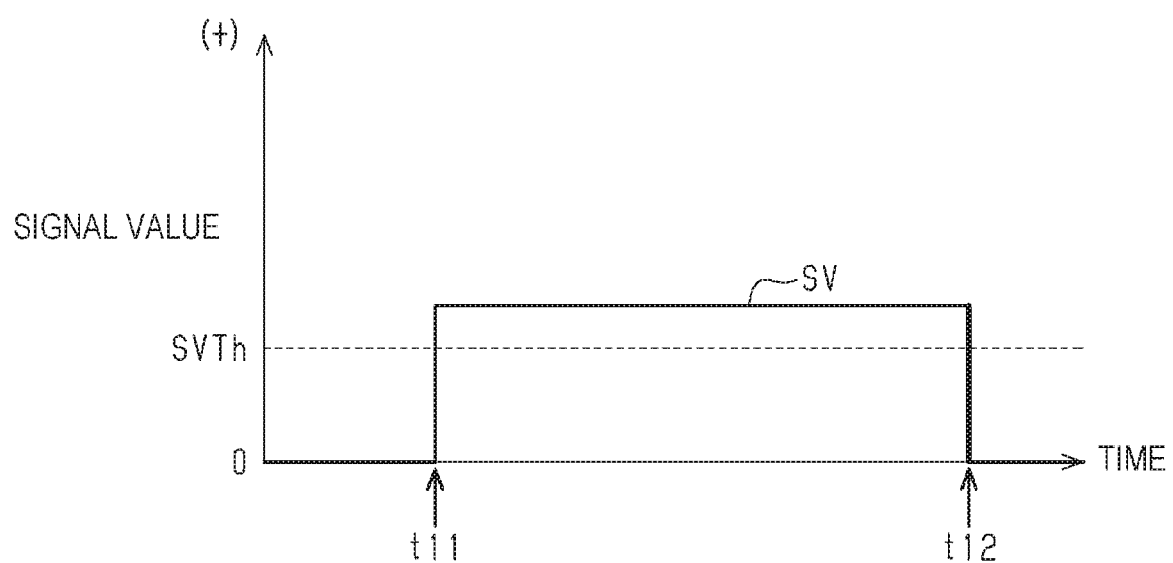
FIG. 7 is a timing chart illustrating the transition of a signal value indicating the magnitude of an amplified signal output from the electric charge detecting circuit.

In an example illustrated in FIG. 7, the medium M contacts the electrode 41 at a time t11 and is separated from the electrode 41 at a time t12 after the time t11. Therefore, during a time period from the time t11 to the time t12, the signal value SV that indicates the magnitude of the amplified signal SGa is equal to or larger than the determination signal value SVTh. Specifically, during the time period, the medium M is determined as being detected by the electrode 41.

According to the first embodiment, the following effects can be obtained.

(1) When the medium M is transported by the rotation of the feeding roller 21 along the transportation path 100, the medium M rubs against the feeding roller 21, and thus an electric charge adheres to the medium M. Therefore, when the electrode 41 contacts the medium M, the electric charge moves from the medium M to the electrode 41, and the amplified signal SGa having the magnitude corresponding to the amount of the electric charge that moved from the medium M to the electrode 41 is output from the electric charge detecting circuit 42. Therefore, the medium M can be detected even in the case where an optical sensor is not installed above the transportation path 100.

(2) In the first embodiment, the medium M transported along the transportation path 100 is nipped by the feeding roller 21 and the nip section 22. Therefore, large static electricity can be generated between the feeding roller 21 and the medium M and between the nip section 22 and the medium M. As a result, the amount of electric charges adhering to the medium M can be large.

(3) In the first embodiment, the medium M transported along the transportation path 100 can be detected by comparing the signal value SV indicating the magnitude of the amplified signal SGa with the determination signal value SVTh.

(4) The electrode 41 is installed upstream of the readers 12 and 13 in the transportation direction. Therefore, the medium M can be detected by using the electrode 41 before the medium M reaches a position where the readers 12 and 13 are installed. In addition, a rear end of the medium M of which images are already read by the readers 12 and 13 can be detected by using the electrode 41.

Second Embodiment

Figure 8:
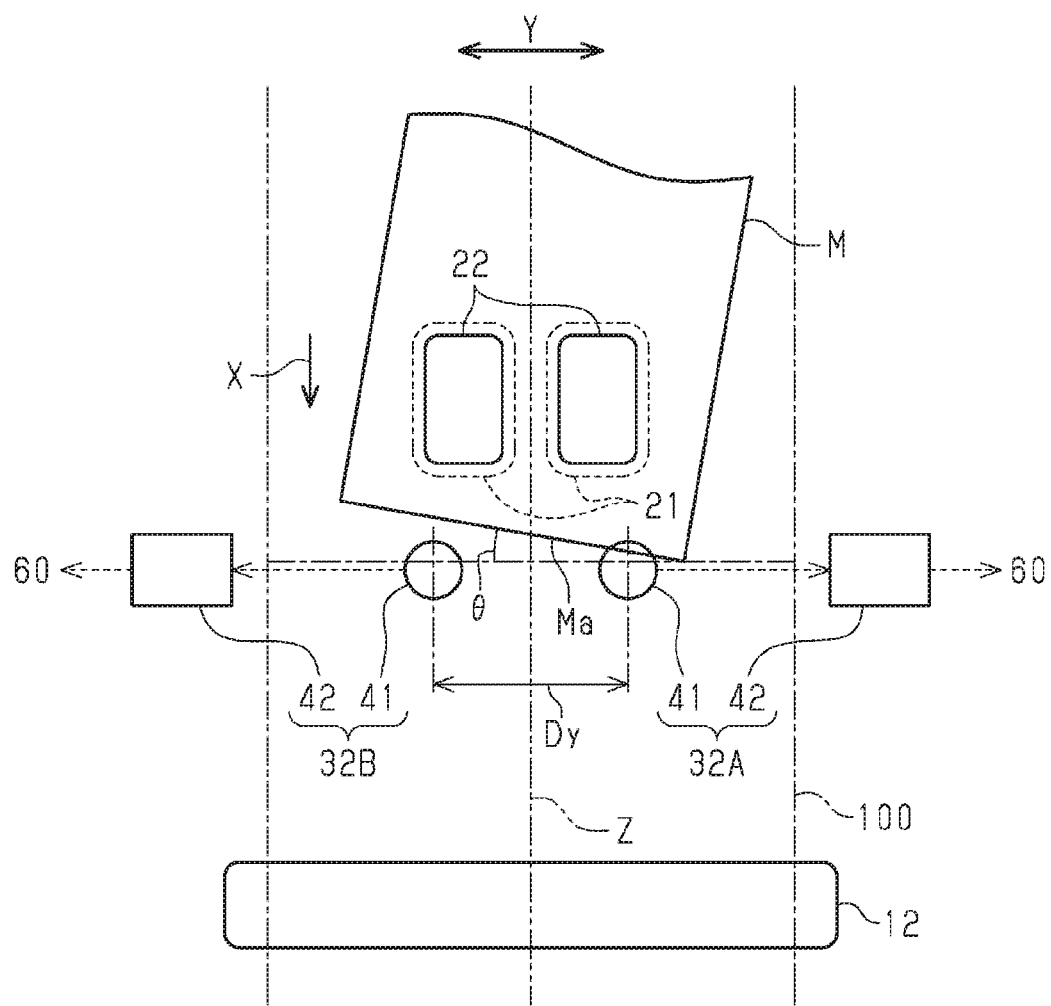
FIG. 8 is a plan view schematically illustrating a portion of an image reading apparatus according to a second embodiment.
Figure 9:
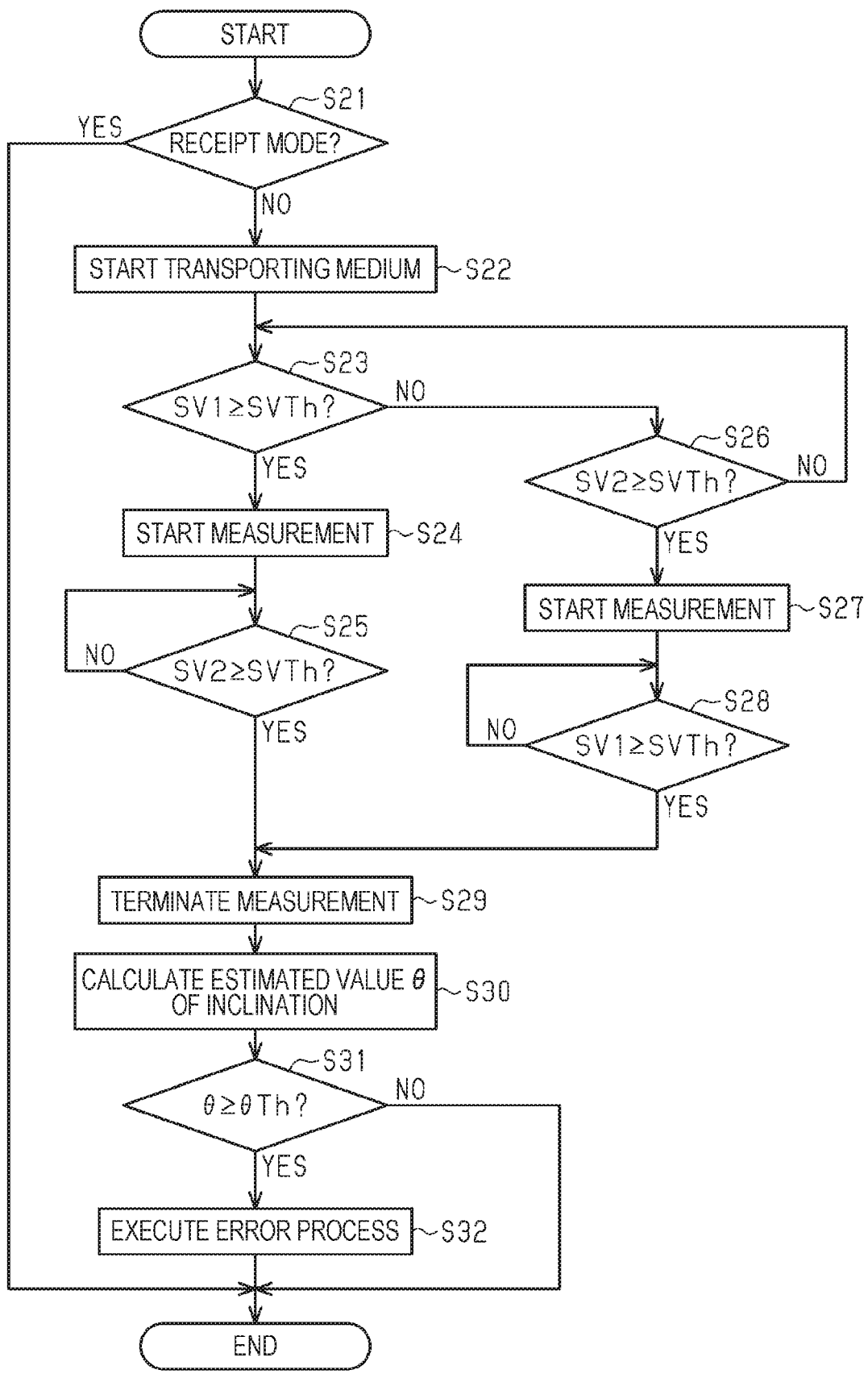
FIG. 9 is a flowchart illustrating the flow of a process to be executed by a controller of the image reading apparatus.
Figure 10:
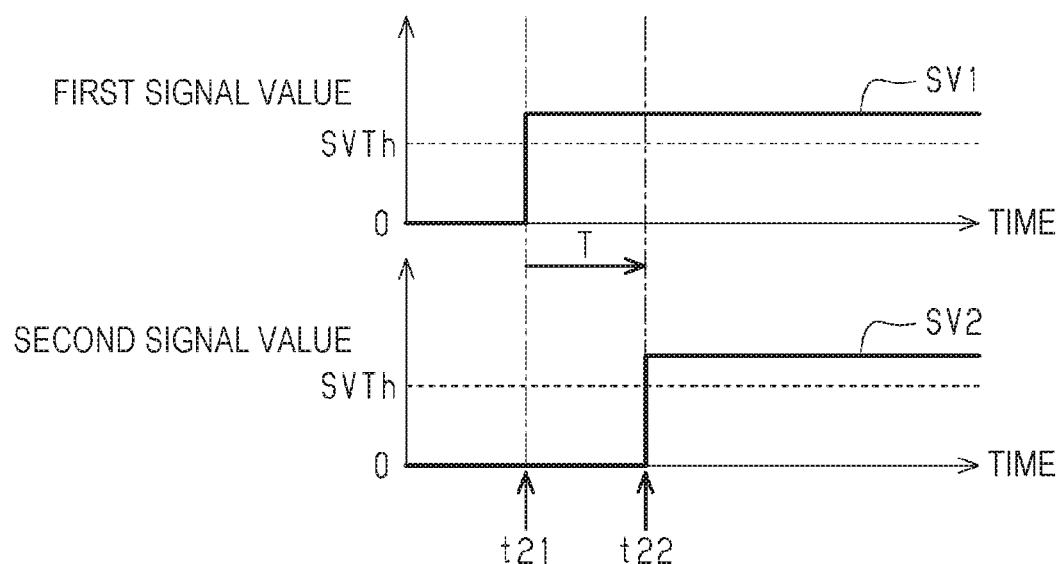
FIG. 10 is a timing chart illustrating the transition of a signal value.

Next, a second embodiment of the medium transporting apparatus and the image reading apparatus is described in accordance with FIGS. 8 to 10. In the second embodiment, the number of electrostatic detection sensors installed, details of processes to be executed by the controller 60, and the like are different from those described in the first embodiment. The following second embodiment mainly describes features different from the first embodiment. Component configurations that are the same as or correspond to those described in the first embodiment are indicated by the same reference signs as those described in the first embodiment, and a duplicate description is omitted.

As illustrated in FIG. 8, a medium transporting apparatus 20 includes two electrostatic detection sensors 32A and 32B. Each of the electrostatic detection sensors 32A and 32B includes an electrode 41 installed downstream (as indicated by X) of the nip section 22 in the transportation direction, and an electric charge detecting circuit 42 coupled to the electrode 41. In an example illustrated in FIG. 8, the two electrodes 41 are located at the same position in the transportation direction of the medium M. In addition, the two electrodes 41 are located at different positions in the width direction Y. The minimum distance from the electrode 41 of the electrostatic detection sensor 32A to a central axis Z of the transportation path 100 is equal to the minimum distance from the electrode 41 of the electrostatic detection sensor 32B to the central axis Z of the transportation path 100.

Next, the flow of a process to be executed by the controller 60 in the transportation of the medium M is described with reference to FIG. 9. Processes illustrated in FIG. 9 are executed by the controller 60. The processes illustrated in FIG. 9 are executed to calculate an estimated value θ of the inclination of the medium M transported along the transportation path 100 with respect to the transportation path 100. In FIG. 8, when the central axis Z of the transportation path 100 is parallel to a central axis of the medium M, the estimated value θ of the inclination is "0".

As illustrated in FIG. 9, in the first step S21, whether a transportation mode for the medium M is a receipt mode is determined. When the medium M transported is a receipt, a dimension of the medium M in the width direction Y is small. When the medium M with the small dimension in the width direction Y is transported, the estimated value θ of the inclination of the medium M may not be calculated. Therefore, when the transportation mode is the receipt mode (YES in step S21), the series of processes illustrated in FIG. 9 are terminated. On the other hand, when the transportation mode is not the receipt mode (NO in step S21), the process proceeds to the next step S22.

In step S22, the transportation of the medium M is started. Specifically, the driving of the driving motor 25 is started. Then, the feeding roller 21, the transport roller 231 and 232, and the discharge rollers 241 and 242 are started to rotate. By the rotation, the medium M is transported at a constant transportation speed.

In the next step S23, whether a first signal value SV1 that indicates the magnitude of an amplified signal SGa input to the controller 60 from the electric charge detecting circuit 42 of the electrostatic detection sensor 32A is equal to or larger than the determination signal value SVTh is determined. When the first signal value SV1 is equal to or larger than the determination signal value SVTh (YES in step S23), the medium M has been detected by the electrostatic detection sensor 32A and thus the process proceeds to the next step S24. In step S24, the measurement of a time period T elapsed from the time when the first signal value SV1 became equal to or larger than the determination signal value SVTh is started.

Subsequently, in step S25, whether a second signal value SV2 that indicates the magnitude of an amplified signal SGa input to the controller 60 from the electric charge detecting circuit 42 of the electrostatic detection sensor 32B is equal to or larger than the determination signal value SVTh is determined. When the second signal value SV2 is smaller than the determination signal value SVTh (NO in step S25), the determination of step S25 is repeated until the second signal value SV2 becomes equal to or larger than the determination signal value SVTh. On the other hand, when the second signal value SV2 is equal to or larger than the determination signal value SVTh (YES in step S25), the medium M has been detected by the electrostatic detection sensor 32B and thus the process proceeds to the next step S29.

On the other hand, when the first signal value SV1 is smaller than the determination signal value SVTh (NO in step S23), the process proceeds to the next step S26. In step S26, whether the second signal value SV2 is equal to or larger than the determination signal value SVTh is determined. When the second signal value SV2 is smaller than the determination signal value SVTh (NO in step S26), the process proceeds to the foregoing step S23. On the other hand, when the second signal value SV2 is equal to or larger than the determination signal value SVTh (YES in step S26), the medium M has been detected by the electrostatic detection sensor 32B and thus the process proceeds to the next step S27. In step S27, the measurement of a time period T elapsed from the time when the second signal value SV2 became equal to or larger than the determination signal value SVTh is started.

Subsequently, in step S28, whether the first signal value SV1 is equal to or larger than the determination signal value SVTh is determined. When the first signal value SV1 is smaller than the determination signal value SVTh (NO in step S28), the determination of step S28 is repeated until the first signal value SV1 becomes equal to or larger than the determination signal value SVTh. On the other hand, when the first signal value SV1 is equal to or larger than the determination signal value SVTh (YES in step S28), the medium M has been detected by the electrostatic detection sensor 32A, and the process proceeds to the next step S29.

In step S29, the measurement of the elapsed time period T is terminated. In the next step S30, the estimated value θ of the inclination of the medium M is calculated based on the measured elapsed time period T. For example, the estimated value θ of the inclination can be calculated using the following relational equation (1). In the relational equation (1), "S" is the transportation speed of the medium M, and "Dy" is a distance between the two electrodes 41 in the width direction Y. "T·S" indicated in the relational equation (1) is larger as the difference between the time when the magnitude of the amplified signal SGa output from the electric charge detecting circuit 42 corresponding to a first electrode of the two electrodes 41 becomes equal to or larger than the determination signal value SVTh and the time when the magnitude of the amplified signal SGa output from the electric charge detecting circuit 42 corresponding to a second electrode of the two electrodes 41 becomes equal to or larger than the determination signal value SVTh is larger. Therefore, as the difference is larger, the estimated value θ of the inclination is larger.

$$\theta = \arctan\left(\frac{T \cdot S}{Dy}\right) \quad (1)$$

After the estimated value θ of the inclination is calculated, the process proceeds to the next step S31. In step S31, whether the estimated value θ of the inclination is equal to or larger than an inclination determination value θTh is determined. The inclination determination value θTh is set as a standard for determination of whether the transportation of the medium M is to be canceled to protect the medium M.

Before the transportation of the medium M, when the controller 60 can acquire the dimension of the medium M in the width direction Y, the controller 60 makes the inclination determination value θTh variable based on the dimension of the transported medium M in the width direction Y. Specifically, the inclination determination value θTh is set to a value that is larger as the dimension of the transported medium M in the width direction Y is smaller.

When the transported medium M deviates from the transportation path 100 in the width direction Y, the medium M may be damaged. As the inclination of the transported medium M is larger, the possibility that the medium M may deviate from the transportation path 100 in the width direction Y is higher. A medium M with a small dimension in the width direction Y hardly deviates from the transportation path 100 even when the medium M is inclined with respect to the transportation path 100, compared to a medium M with a large dimension in the width direction Y. Therefore, the inclination determination value θTh is set to the value that is larger as the dimension of the medium M in the width direction Y is smaller.

When the estimated value θ of the inclination is smaller than the inclination determination value θTh (NO in step S31), the series of processes illustrated in FIG. 9 are terminated. Specifically, the medium M is transported. On the other hand, when the estimated value θ of the inclination is equal to or larger than the inclination determination value θTh (YES in step S31), the process proceeds to the next step S32. In step S32, an error process is executed. For example, as the error process, the transportation of the medium M is canceled. In addition, as the error process, the fact that the medium M being transported is inclined with respect to the transportation path 100 is notified. After the error process is executed, the series of processes illustrated in FIG. 9 are terminated.

Effects of the second embodiment are described with reference to FIGS. 8 and 10.

As illustrated in FIG. 8, it is assumed that the medium M transported along the transportation path 100 is inclined. Specifically, in an example illustrated in FIG. 8, before the medium M contacts the electrode 41 of the electrostatic detection sensor 32B, the medium M contacts the electrode 41 of the electrostatic detection sensor 32A. Therefore, as illustrated in FIG. 10, the first signal value SV1 is equal to or larger than the determination signal value SVTh at a time t21. Specifically, while the medium M is detected by the electrostatic detection sensor 32A, the medium M is not detected by the electrostatic detection sensor 32B. At a time t22 after the time t21, the medium M contacts the electrode 41 of the electrostatic detection sensor 32B and thus the second signal value SV2 is equal to or larger than the determination signal value SVTh.

In an example illustrated in FIG. 10, a time period from the time t21 to the time t22 corresponds to the elapsed time period T. The estimated value θ of the inclination of the medium M is calculated using the foregoing relational equation (1). When the estimated value θ of the inclination is smaller than the inclination determination value θTh, the transportation of the medium M is continued and the readers 12 and 13 read images of the medium M. On the other hand, when the estimated value θ of the inclination is equal to or larger than the inclination determination value θTh, and the transportation of the medium M is continued, the medium M may be damaged. Therefore, the transportation of the medium M is canceled.

According to the second embodiment, the following effects can be obtained as well as effects that are the same as or equivalent to the foregoing effects (1) to (4).

(5) By arranging the plurality of electrodes 41 in the width direction Y, the estimated value θ of the inclination of the medium M transported along the transportation path 100 can be calculated.

(6) When the calculated estimated value θ of the inclination of the medium M is equal to or larger than the inclination determination value θTh, the transportation of the medium M is canceled. It is, therefore, possible to suppress the possibility of damaging the medium M.

(7) In the second embodiment, the inclination determination value θTh is set based on the dimension of the medium M in the width direction Y, while the medium M is to be transported. Since a large value is set as the inclination determination value θTh when a medium M with a small dimension in the width direction Y is to be transported, the transportation of the medium M is continued even when the medium M is slightly inclined. Specifically, images of the medium M can be read.

(8) In the second embodiment, the plurality of electrodes 41 are installed upstream of the readers 12 and 13 in the transportation direction. Therefore, before images of the medium M are read by the readers 12 and 13, whether the transportation of the medium M is to be canceled can be determined. Therefore, an effect of suppressing the possibility of damaging the medium M can be improved.

(9) The image reading apparatus 10 can detect the inclination of the medium M based on results of the reading by the readers 12 and 13. Whether the estimated value θ of the inclination is correct can be determined by comparing a detected value of the inclination of the medium M with the estimated value θ of the inclination.

Third Embodiment

Figure 11:
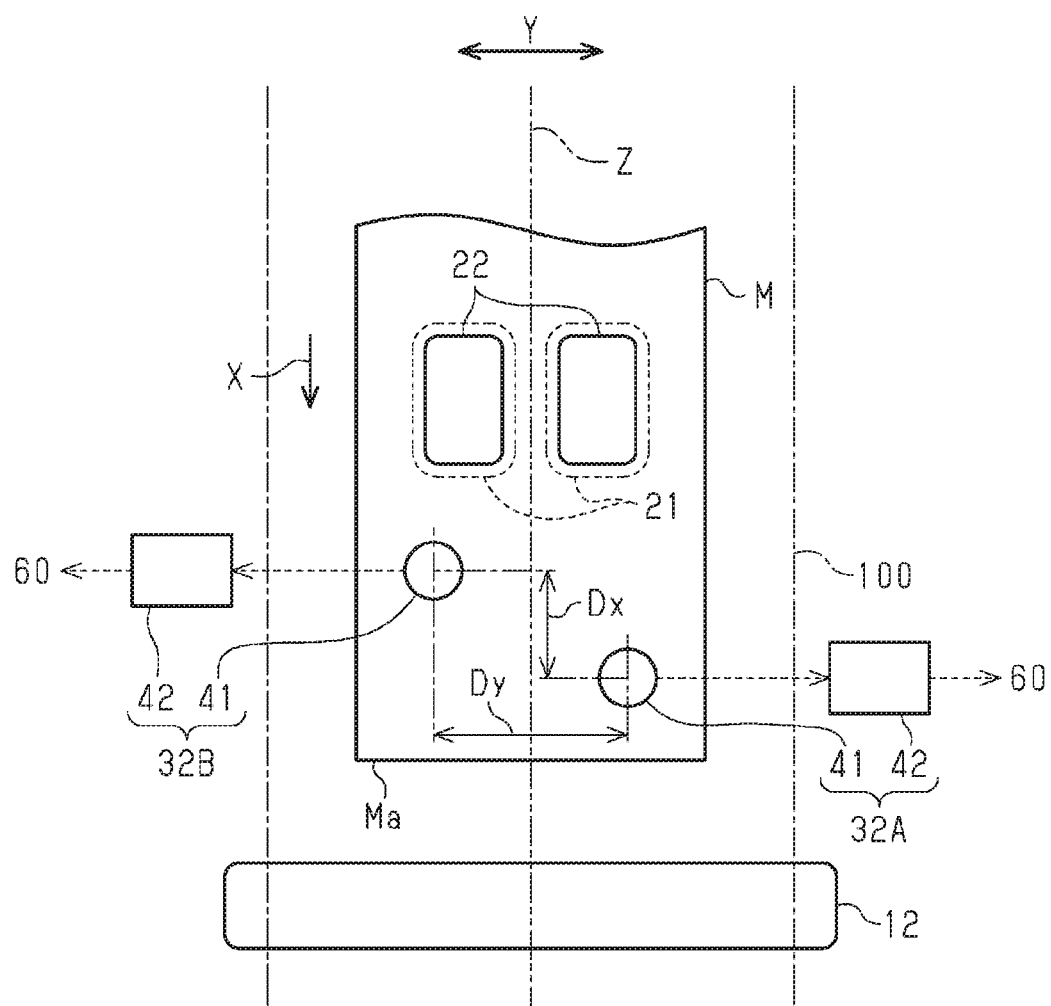
FIG. 11 is a plan view schematically illustrating a portion of an image reading apparatus according to a third embodiment.
Figure 12:
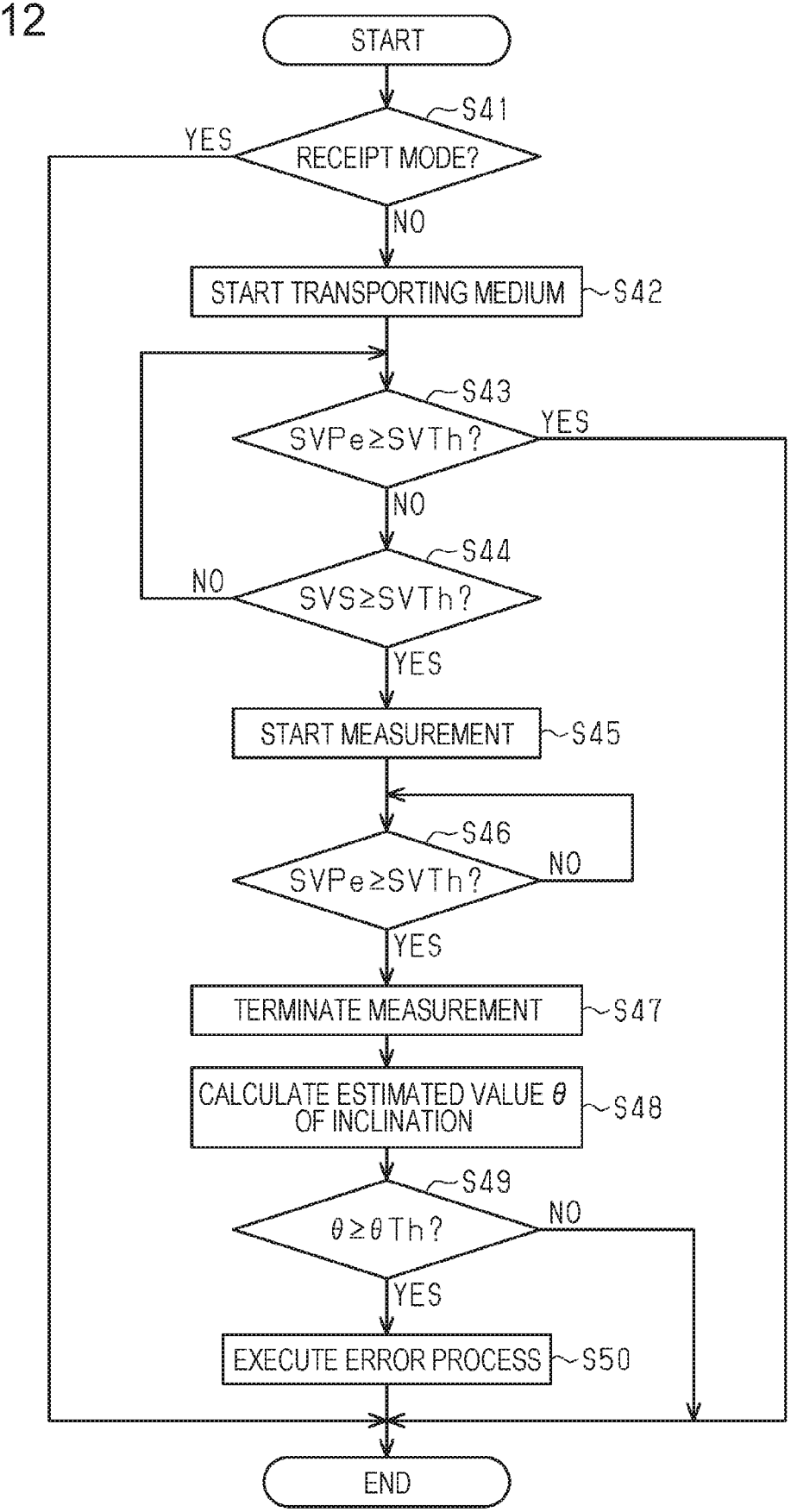
FIG. 12 is a flowchart illustrating the flow of a process to be executed by a controller of the image reading apparatus.

Next, a third embodiment of the medium transporting apparatus and the image reading apparatus is described in accordance with FIGS. 11 and 12. In the third embodiment, positions at which electrodes of electrostatic detection sensors are installed, details of processes to be executed by the controller 60, and the like are different from those described in the second embodiment. The following third embodiment mainly describes features different from the foregoing embodiments. Component configurations that are the same as or correspond to those described in the foregoing embodiments are indicated by the same reference signs as those described in the foregoing embodiments, and a duplicate description is omitted.

As illustrated in FIG. 11, the electrode 41 of the electrostatic detection sensor 32A is installed downstream (as indicated by X) of the electrode 41 of the electrostatic detection sensor 32B in the transportation direction. Of the electrostatic detection sensors 32A and 32B, the electrostatic detection sensor 32A with the electrode 41 installed downstream (as indicated by X) in the transportation direction also functions as a sensor for detecting the front end Ma of the medium M. A distance between the electrode 41 of the electrostatic detection sensor 32A and the electrode 41 of the electrostatic detection sensor 32B in the transportation direction is a transportation direction distance Dx, while a distance between the electrodes 41 in the width direction Y is a distance Dy in the width direction.

Next, the flow of a process to be executed by the controller 60 in the transportation of the media M is described. Processes illustrated in FIG. 12 are executed by the controller 60. The processes illustrated in FIG. 12 are executed to calculate an estimated value θ of the inclination of the medium M transported along the transportation path 100 with respect to the transportation path 100.

As illustrated in FIG. 12, in the first step S41, whether the transportation mode for the medium M is the receipt mode is determined. When the transportation mode is the receipt mode (YES in step S41), the series of processes illustrated in FIG. 12 are terminated. On the other hand, when the transportation mode is not the receipt mode (NO in step S41), the process proceeds to the next step S42. In step S42, the transportation of the medium M is started. Specifically, the driving of the driving motor 25 is started. Then, the feeding roller 21, the transport rollers 231 and 232, and the discharge rollers 241 and 242 are started to rotate. By the rotation, the medium M is transported at a constant transportation speed.

In the next step S43, whether a signal value SVPe that indicates the magnitude of an amplified signal SGa input to the controller 60 from the electric charge detecting circuit 42 of the electrostatic detection sensor 32A is equal to or larger than the determination signal value SVTh is determined. When the magnitude of the amplified signal SGa input to the controller 60 from the electric charge detecting circuit 42 of the electrostatic detection sensor 32B is a signal value SVS, the signal value SVPe does not become equal to or larger than the determination signal value SVTh before the signal value SVS becomes equal to or larger than the determination signal value SVTh. This is due to the fact that the electrode 41 of the electrostatic detection sensor 32A is located downstream (as indicated by X) of the electrode 41 of the electrostatic detection sensor 32B in the transportation direction. In other words, in the case where the signal value SVPe becomes equal to or larger than the determination signal value SVTh before the signal value SVS becomes equal to or larger than the determination signal value SVTh, there is a possibility that an abnormality of some kind has occurred. Therefore, when the signal value SVPe is equal to or larger than the determination signal value SVTh (YES in step S43) regardless of the fact that the signal value SVS is smaller than the determination signal value SVTh, the series of processes illustrated in FIG. 12 are terminated.

When the signal value SVPe is equal to or larger than the determination signal value SVTh (YES in step S43), the process may proceed to step S50 described later. Specifically, the transportation of the medium M may be canceled.

On the other hand, when the signal value SVPe is smaller than the determination signal value SVTh (NO in step S43), the process proceeds to the next step S44. In step S44, whether the signal value SVS is equal to or larger than the determination signal value SVTh is determined. When the signal value SVS is smaller than the determination signal value SVTh (NO in step S44), the process proceeds to the foregoing step S43. On the other hand, when the signal value SVS is equal to or larger than the determination signal value SVTh (YES in step S44), the medium M has been detected by the electrostatic detection sensor 32B and thus the process proceeds to the next step S45. In step S45, the measurement of a time period T elapsed from the time when the signal value SVS became equal to or larger than the determination signal value SVTh is started.

In step S46, whether the signal value SVPe is equal to or larger than the determination signal value SVTh is determined. When the signal value SVPe is smaller than the determination signal value SVTh (NO in step S46), the determination of step S46 is repeated until the signal value SVPe becomes equal to or larger than the determination signal value SVTh. On the other hand, when the signal value SVPe is equal to or larger than the determination signal value SVTh (YES in step S46), the front end Ma of the medium M has been detected by the electrostatic detection sensor 32A and thus the process proceeds to step S47. In step S47, the measurement of the elapsed time period T is terminated.

As described above, the electrostatic detection sensor 32A also serves as a sensor for detecting the front end Ma of the medium M. Therefore, when the medium M is detected by the electrostatic detection sensor 32A, the position of the front end Ma of the medium M in the transportation direction can be estimated. As a result, the timing of reading images of the medium M by the readers 12 and 13 can be adjusted.

Subsequently, in step S48, the estimated value θ of the inclination of the medium M is calculated. For example, the estimated value θ of the inclination can be calculated by using the following relational equation (2). In the relational equation (2), "S" is the transportation speed of the medium M. In the relational equation (2), "T·S-Dx" corresponds to the amount of movement of the medium M during a time period from the time when the medium M contacts the first electrode to the time when the medium M contacts the second electrode. According to the relational equation (2), as the amount of movement of the medium M is larger, the estimated value θ of the inclination is larger.

$$\theta = \arctan\left(\frac{T \cdot s - Dx}{Dy}\right) \quad (2)$$

After the estimated value θ of the inclination is calculated, the process proceeds to the next step S49. In step S49, whether the estimated value θ of the inclination is equal to or larger than the inclination determination value θTh is determined. When the estimated value θ of the inclination is smaller than the inclination determination value θTh (NO in step S49), the series of processes illustrated in FIG. 12 are terminated. Specifically, the transportation of the medium M is executed.

On the other hand, when the estimated value θ of the inclination is equal to or larger than the inclination determination value θTh (YES in step S49), the process proceeds to the next step S50. In step S50, an error process is executed. For example, as the error process, the transportation of the medium M is canceled. In addition, as the error process, the fact that the medium M being transported is inclined is notified. When the error process is executed, the series of processes illustrated in FIG. 12 are terminated.

According to the third embodiment, the following effects can be obtained as well as effects that are the same as or equivalent to the foregoing effects (1) to (9).

(10) Even when the two electrodes 41 are located at different positions in the transportation direction, the positions of the two electrodes 41 in the width direction Y are different from each other, and the estimated value θ of the inclination of the medium M can be calculated.

(11) The electrostatic detection sensor 32A also functions as a sensor for detecting the front end Ma of the medium M. Therefore, the detection sensor 31 illustrated in FIG. 1 can be omitted.

Fourth Embodiment

Next, a fourth embodiment of the medium transporting apparatus and the image reading apparatus is described in accordance with FIGS. 13 to 16. In the fourth embodiment, the number of electrostatic detection sensors installed, details of processes to be executed by the controller 60, and the like are different from those described in the second embodiment. The following fourth embodiment mainly describes features different from the foregoing embodiments. Component configurations that are the same as or correspond to those described in the embodiments are indicated by the same reference signs as those described in the embodiments, and a duplicated description is omitted.

Figure 13:
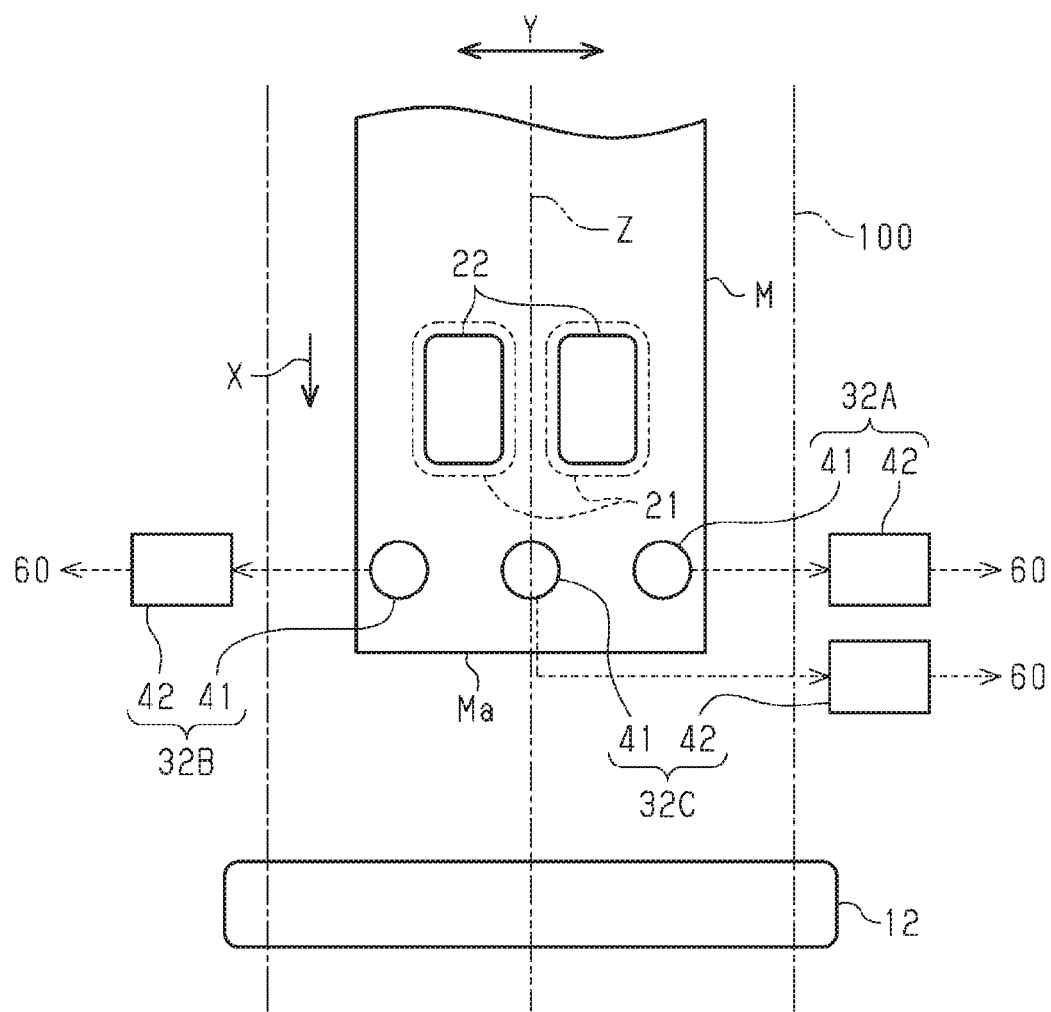
FIG. 13 is a plan view schematically illustrating a portion of an image reading apparatus according to a fourth embodiment.

As illustrated in FIG. 13, a medium transporting apparatus 20 includes three electrostatic detection sensors 32A, 32B, and 32C. Each of the electrostatic detection sensors 32A to 32C includes an electrode 41 installed downstream (as indicated by X) of the nip section 22 in the transportation direction, and an electric charge detecting circuit 42 coupled to the electrode 41. In an example illustrated in FIG. 13, the three electrodes 41 are located at the same position in the transportation direction of the media M. The electrode 41 of the electrostatic detection sensor 32C is located between the electrode 41 of the electrostatic detection sensor 32A and the electrode 41 of the electrostatic detection sensor 32B. For example, the electrode 41 of the electrostatic detection sensor 32C is located at a central position between the electrode 41 of the electrostatic detection sensor 32A and the electrode 41 of the electrostatic detection sensor 32B.

Figure 14:
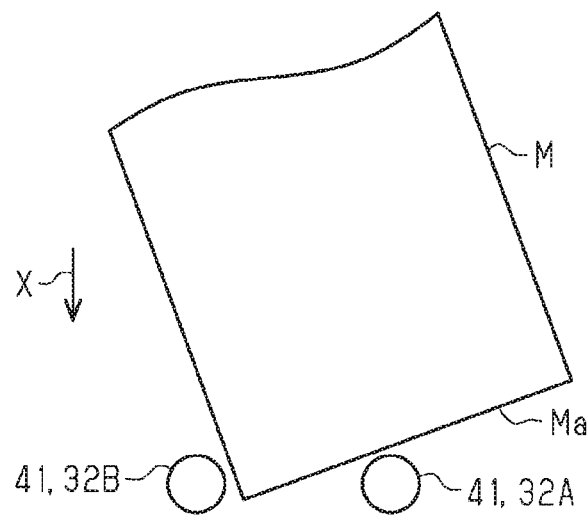
FIG. 14 is a schematic diagram of a medium transporting apparatus according to a comparative example.

A comparative example in which two electrostatic detection sensors 32A and 32B are installed is described with reference to FIG. 14. In the comparative example, when the medium M is inclined with respect to a transportation path 100, the two electrostatic detection sensors 32A and 32B may simultaneously detect the medium M as illustrated in FIG. 14.

Figure 15:
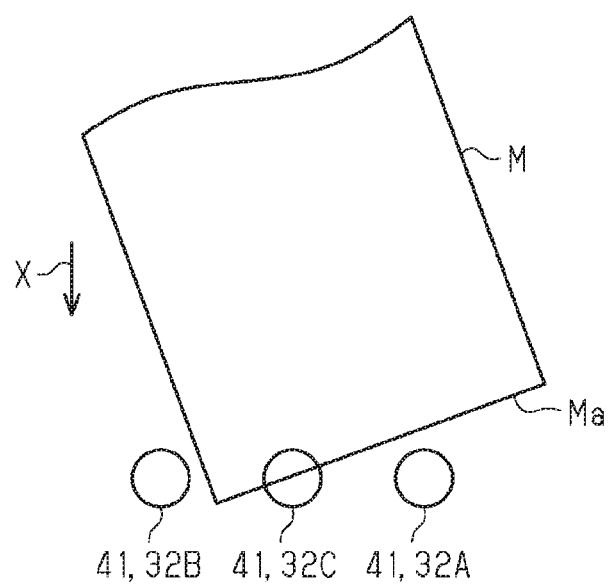
FIG. 15 is a schematic diagram of a medium transporting apparatus of the image reading apparatus according to the fourth embodiment.

In the fourth embodiment, the three electrodes 41 are arranged in the width direction Y. Therefore, when the medium M is inclined with respect to the transportation path 100, the three electrostatic detection sensors 32A to 32C do not simultaneously detect the medium M. For example, even when the two electrostatic detection sensors 32A and 32B simultaneously detect the medium M as illustrated in FIG. 15, the time when the electrostatic detection sensor 32C detects the medium M is different from the time when the electrostatic detection sensors 32A and 32B detect the medium M.

Figure 16:
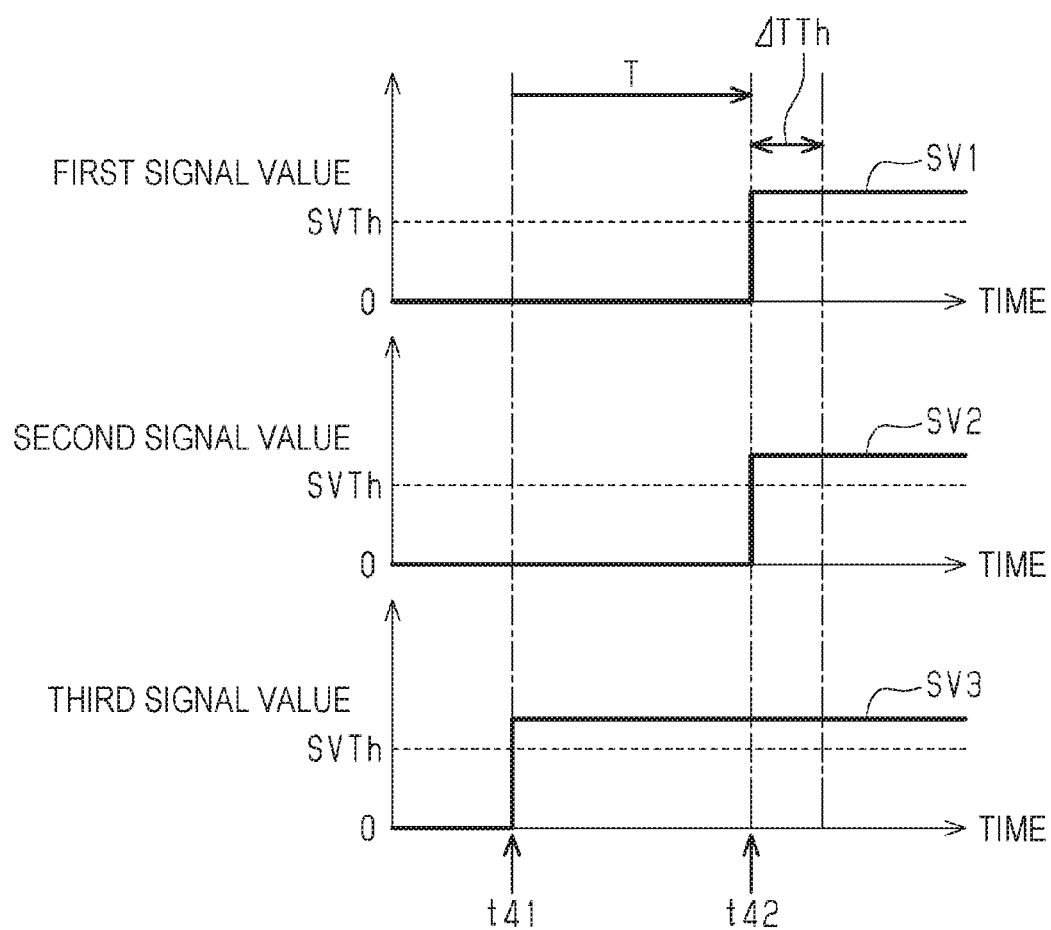
FIG. 16 is a timing chart illustrating the transition of each signal value.

In this case, the electrostatic detection sensor 32C first detects the medium M. After that, the electrostatic detection sensors 32A and 32B detect the medium M. Therefore, as illustrated in FIG. 16, among first, second, and third signal values SV1, SV2, and SV3, the third signal value SV3 is equal to or larger than the determination signal value SVTh at a time t41. The third signal value SV3 indicates the magnitude of an amplified signal SGa input to the controller 60 from the electric charge detecting circuit 42 of the electrostatic detection sensor 32C. The first signal value SV1 indicates the magnitude of an amplified signal SGa input to the controller 60 from the electric charge detecting circuit 42 of the electrostatic detection sensor 32A. The second signal value SV2 indicates the magnitude of an amplified signal SGa input to the controller 60 from the electric charge detecting circuit 42 of the electrostatic detection sensor 32B.

At a time t42 after the time t41, the first signal value SV1 and the second signal value SV2 are equal to or larger than the determination signal value SVTh. In this case, the difference between the time when the electrostatic detection sensor 32A detects the medium M and the time when the electrostatic detection sensor 32B detects the medium M is smaller than a difference determination value $\Delta$TTh. Therefore, in this case, a time period from the time t41 to the time t42 corresponds to the elapsed time period T. The estimated value $\theta$ of the inclination of the medium M can be calculated by substituting the elapsed time period T, the transportation speed S of the medium M, a distance Dy between the electrode 41 of the electrostatic detection sensor 32C and the electrode 41 of the electrostatic detection sensor 32A in the width direction Y into the foregoing relational equation (1).

Specifically, in the fourth embodiment, when the medium M is inclined with respect to the transportation path 100, it is possible to suppress the possibility of erroneously determining the medium M as not being inclined with respect to the transportation path 100 when the medium M is actually inclined with respect to the transportation path 100.

When the difference between the time when the electrostatic detection sensor 32A detects the medium M and the time when the electrostatic detection sensor 32B detects the medium M is equal to or larger than the difference determination value $\Delta$TTh, the time when the electrostatic detection sensor 32A detects the medium M and the time when the electrostatic detection sensor 32B detects the medium M can be determined as being different from each other. Therefore, in this case, the difference between the time when the electrostatic detection sensor 32A detects the medium M and the time when the electrostatic detection sensor 32B detects the medium M corresponds to the elapsed time period T. The estimated value $\theta$ of the inclination of the medium can be calculated by substituting the elapsed time period T, the transportation speed S of the medium M, a distance Dy between the electrode 41 of the electrostatic detection sensor 32A and the electrode 41 of the electrostatic detection sensor 32B in the width direction Y into the foregoing relational equation (1).

Fifth Embodiment

Figure 17:
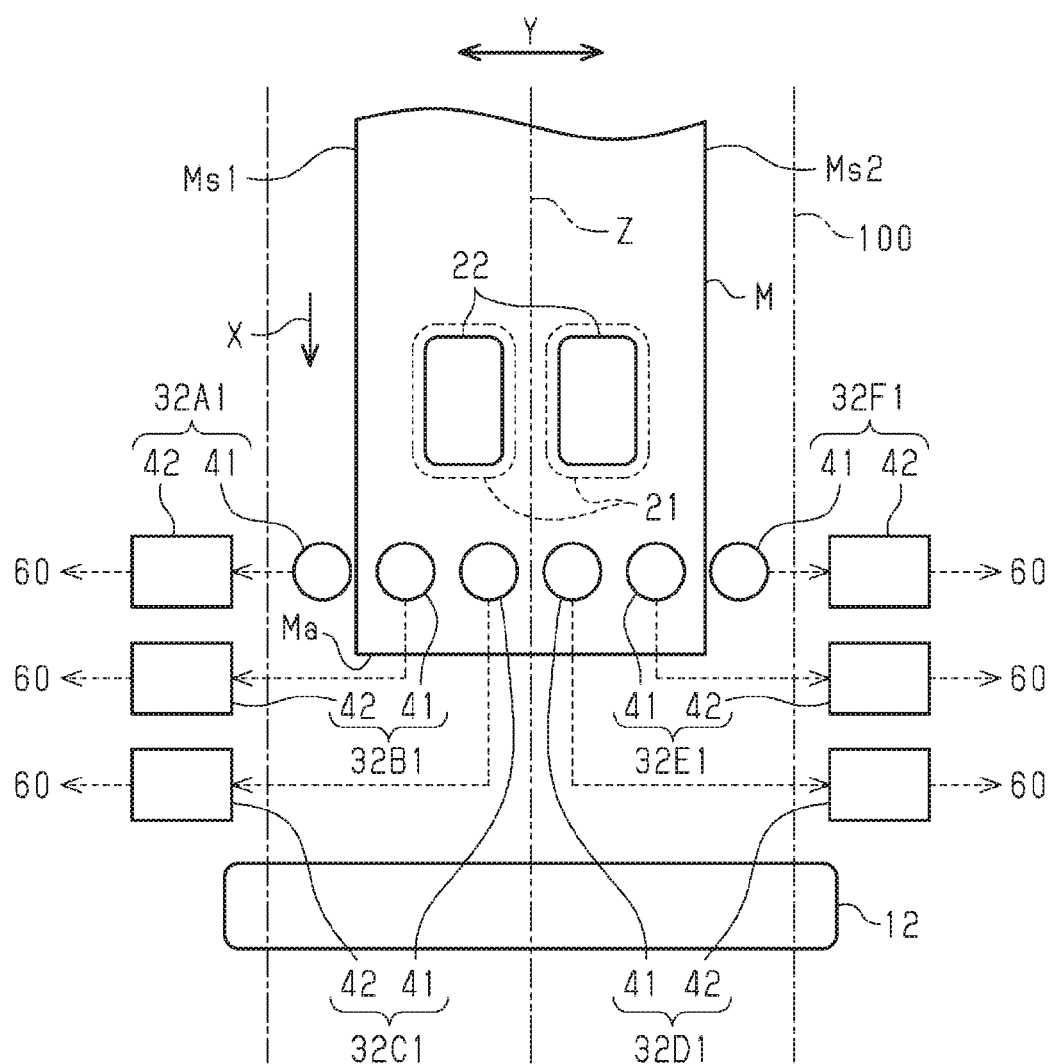
FIG. 17 is a plan view schematically illustrating a portion of an image reading apparatus according to a fifth embodiment.
Figure 18:
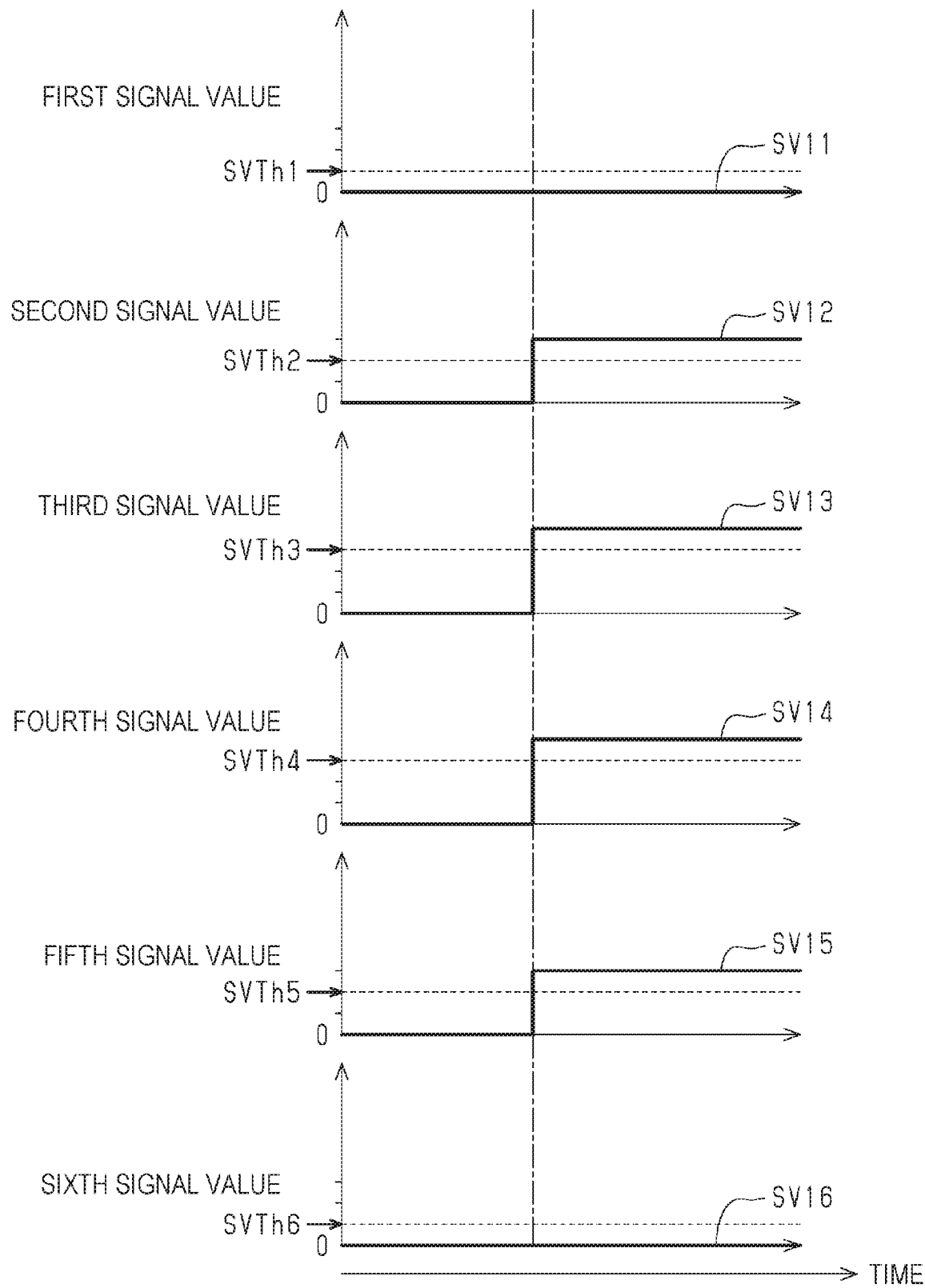
FIG. 18 is a timing chart illustrating the transition of each signal value.

Next, a fifth embodiment of the medium transporting apparatus and the image reading apparatus is described in accordance with FIGS. 17 and 18. In the fifth embodiment, the number of electrostatic detection sensors installed, details of processes to be executed by the controller 60, and the like are different from those described in the second embodiment. The following fifth embodiment mainly describes features different from the foregoing embodiments. Component configurations that are the same as or correspond to those described in the embodiments are indicated by the same reference signs as those described in the embodiments, and a duplicate description is omitted.

As illustrated in FIG. 17, a medium transporting apparatus 20 according to the fifth embodiment includes four or more electrostatic detection sensors. In an example illustrated in FIG. 17, the medium transporting apparatus 20 includes sixth electrostatic detection sensors 32A1, 32B1, 32C1, 32D1, 32E1, and 32F1. Each of the electrostatic detection sensors 32A1 to 32F1 includes an electrode 41 and an electric charge detecting circuit 42. The electrodes 41 are installed downstream (as indicated by X) of the nip section 22 in the transportation direction. The electrodes 41 are arranged in the width direction Y. For example, the electrodes 41 are arranged at equal intervals in the width direction Y.

Since the electrodes 41 are arranged in the width direction Y, the dimension of the medium M in the width direction Y and side ends Ms1 and Ms2 of the medium M can be detected. The side ends Ms1 and Ms2 of the medium M are ends of the medium M in the width direction Y.

The magnitude of an amplified signal SGa input to the controller 60 from the electric charge detecting circuit 42 of the electrostatic detection sensor 32A1 is referred to as first signal value SV11. The magnitude of an amplified signal SGa input to the controller 60 from the electric charge detecting circuit 42 of the electrostatic detection sensor 32B1 is referred to as second signal value SV12. The magnitude of an amplified signal SGa input to the controller 60 from the electric charge detecting circuit 42 of the electrostatic detection sensor 32C1 is referred to as third signal value SV13. The magnitude of an amplified signal SGa input to the controller 60 from the electric charge detecting circuit 42 of the electrostatic detection sensor 32D1 is referred to as fourth signal value SV14. The magnitude of an amplified signal SGa input to the controller 60 from the electric charge detecting circuit 42 of the electrostatic detection sensor 32E1 is referred to as fifth signal value SV15. The magnitude of an amplified signal SGa input to the controller 60 from the electric charge detecting circuit 42 of the electrostatic detection sensor 32F1 is referred to as sixth signal value SV16.

In the example illustrated in FIG. 17, of the side ends Ms1 and Ms2 of the medium M, the first side end Ms1 is located between the electrode 41 of the electrostatic detection sensor 32A1 and the electrode 41 of the electrostatic detection sensor 32B1. The second side end Ms2 is located between the electrode 41 of the electrostatic detection sensor 32E1 and the electrode 41 of the electrostatic detection sensor 32F1. Therefore, the electrode 41 of the electrostatic detection sensor 32A1 and the electrode 41 of the electrostatic detection sensor 32F1 do not contact the medium M. On the other hand, the electrodes 41 of the other electrostatic detection sensors 32B1 to 32E1 contact the medium M.

As a result, as illustrated in FIG. 18, the second signal value SV12 is equal to or larger than a second determination signal value SVTh2, and the third signal value SV13 is equal to or larger than a third determination signal value SVTh3. The fourth signal value SV14 is equal to or larger than a fourth determination signal value SVTh4, and the fifth signal value SV15 is equal to or larger than a fifth determination signal value SVTh5. On the other hand, the first signal value SV11 is smaller than a first determination signal value SVTh1, and the sixth signal value SV16 is smaller than a sixth determination signal value SVTh6. Therefore, the controller 60 can determine that the first side end Ms1 of the medium M is located between the electrode 41 of the electrostatic detection sensor 32A1 and the electrode 41 of the electrostatic detection sensor 32B1. In addition, the controller 60 can determine that the second side end Ms2 of the medium M is located between the electrode 41 of the electrostatic detection sensor 32E1 and the electrode 41 of the electrostatic detection sensor 32F1. Based on the results of the determination, the controller 60 can obtain the dimension of the medium M in the width direction Y.

The dimension of the medium M in the width direction Y that is obtained using the electrostatic detection sensors 32A1 to 32F1 is referred to as estimated value of the dimension of the medium M in the width direction Y. The image reading apparatus 10 can detect the dimension of the medium M in the width direction Y based on results of the reading by the readers 12 and 13. Whether a detected value of the dimension of the medium M in the width direction Y is correct can be determined by comparing the detected value of the dimension of the medium M in the width direction Y with the estimated value of the dimension of the medium M in the width direction Y.

Amounts of electric charges adhering to portions of the medium that are near the nip section 22 and the feeding roller 21 in the width direction Y are large. On the other hand, amounts of electric charges adhering to portions of the medium that are far from the nip section 22 and the feeding roller 21 in the width direction Y are small. Therefore, even when a portion of the medium M that is far from the nip section 22 and the feeding roller 21 in the width direction Y contacts an electrode 41, a signal value is hardly large. Accordingly, the first and sixth determination signal values SVTh1 and SVTh6 that correspond to the electrostatic detection sensors 32A1 and 32F1 are small. The second and fifth determination signal values SVTh2 and SVTh5 that correspond to the electrostatic detection sensors 32B1 and 32E1 are larger than the first and sixth determination signal values SVTh1 and SVTh6. The third and fourth determination signal values SVTh3 and SVTh4 that correspond to the electrostatic detection sensors 32C1 and 32D1 are larger than the second and fifth determination signal values SVTh2 and SVTh5.

The positions of the side ends Ms1 and Ms2 of the medium M can be appropriately detected by changing the magnitudes of the determination signal values corresponding to the electrostatic detection sensors 32A1 to 32F1.

Modifications

The foregoing embodiments can be changed as follows and implemented. Two or more of the foregoing embodiments and the following modifications can be implemented in combination with each other without causing any technical contradiction The electrodes 41 of the electrostatic detection sensors may be installed downstream (as indicated by X) of the readers 12 and 13 in the transportation direction.

In the fifth embodiment, the number of electrodes 41 arranged in the width direction Y may be an arbitrary number other than 6. For example, the number of electrodes 41 arranged in the width direction Y may be 5 or may be 7 or greater.

The inclination determination value θTh may be fixed to a preset value regardless of the dimension of the medium M in the width direction Y.

In the second embodiment, when the amount of transportation of the medium M can be detected, the amount of transportation of the medium M during a time period from the time when one of the electrostatic detection sensors detects the medium M to the time when the other of the electrostatic detection sensors detects the medium M may be obtained and an estimated value θ of the inclination of the medium M may be obtained based on the obtained amount of transportation of the medium M.

Figure 19:
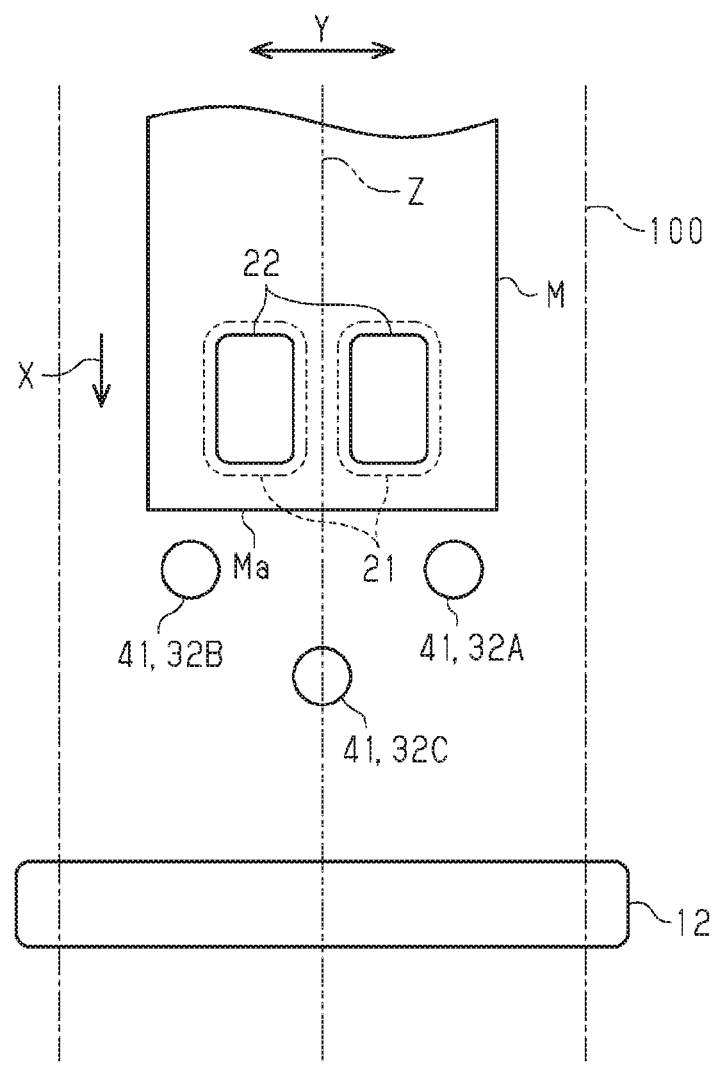
FIG. 19 is a plan view schematically illustrating a portion of an image reading apparatus according to a modification.

In the fourth embodiment, as illustrated in FIG. 19, the electrode 41 of the electrostatic detection sensor 32C may be installed downstream (as indicated by X) of the electrodes 41 of the other electrostatic detection sensors 32A and 32B in the transportation direction. In addition, the electrode 41 of the electrostatic detection sensor 32C may be installed upstream of the electrodes 41 of the other electrostatic detection sensors 32A and 32B in the transportation direction.

As long as the medium M can be transported downstream (as indicated by X) by the rotation of the feeding roller 21 in the transportation direction, the medium transporting apparatus 20 may not include the nip section 22.

As long as the electric charge detecting circuits 42 can output signals having magnitudes that are larger as amounts of electric charges that moved to the electrodes 41 from the medium M are larger, each of the electric charge detecting circuits 42 may have a different configuration from that illustrated in FIG. 5.

The controller 60 may be configured as one or more processors that operate in accordance with a computer program, one or more dedicated hardware circuits such as dedicated hardware for executing at least a part of the various processes, or a circuit including a combination thereof. An example of the dedicated hardware is an application specific integrated circuit (ASIC). Each of the processors includes a CPU and memories such as a RAM and a ROM. The memories store a program code or a command. The program code or the command is configured to cause the CPU to execute the processes. The memories or storage media include any available media that can be accessed by a general-purpose or dedicated computer.

The medium transporting apparatus 20 may be used in an apparatus other than the image reading apparatus 10. For example, the medium transporting apparatus 20 may be used in a recording apparatus such as a printer.

Technical ideas and effects that are recognized from the foregoing embodiments and the modifications are described below.

(A) According to an aspect, a medium transporting apparatus transports a medium along a transportation path. The medium transporting apparatus includes a feeding roller that rotates to transport the medium, an electrode installed downstream of the feeding roller on the transportation path and having conductivity, and an electric charge detecting circuit that outputs a signal having a magnitude corresponding to an amount of an electric charge, which moves from the medium to the electrode after the medium being transported along the transportation path comes into contact with the electrode.

When the medium is transported by the rotation of the feeding roller along the transportation path, the medium rubs against the feeding roller and static electricity is generated between the medium and the feeding roller. Specifically, an electric charge adheres to the medium. According to the foregoing configuration, when the medium with the electric charge adhering thereto is transported, the electrode contacts the medium. Then, the electric charge moves from the medium to the electrode, and the electric charge detecting circuit outputs a signal having a magnitude corresponding to the amount of the electric charge that moved from the medium to the electrode. Therefore, according to the foregoing configuration, the medium can be detected even when an optical sensor is not installed above the transportation path.

(B) The medium transporting apparatus may include a nip section that nips the medium together with the feeding roller. In this case, the electrode is installed downstream of the nip section on the transportation path.

According to the foregoing configuration, the medium transported along the transportation path is nipped by the feeding roller and the nip section. Therefore, large static electricity can be generated between the feeding roller and the medium and between the nip section and the medium. As a result, the amount of electric charges that adhere to the medium can be large.

(C) The medium transporting apparatus may include a controller that determines that the medium is in contact with the electrode when the medium is transported along the transportation path from upstream to downstream in a transportation direction and the magnitude of the signal output from the electric charge detecting circuit is equal to or larger than a detection determination value.

According to the foregoing configuration, the medium transported along the transportation path can be detected using the signal output from the electric charge detecting circuit.

(D) In the medium transporting apparatus, the electrode may include a plurality of electrodes installed at different positions in a width direction of the medium transported along the transportation direction, and the electric charge detecting circuit may include a plurality of electric charge detecting circuits corresponding to the plurality of electrodes. In this case, the controller calculates an estimated value of an inclination of the medium so that the estimated value is larger as a difference between a time when a magnitude of a signal output from an electric charge detecting circuit that is among the plurality of electric charge detecting circuits and corresponds to a first electrode among the plurality of electrodes becomes equal to or larger than the detection determination value and a time when a magnitude of a signal output from an electric charge detecting circuit that is among the plurality of electric charge detecting circuits and corresponds to a second electrode among the plurality of electrodes becomes equal to or larger than the detection determination value is larger.

In the middle of the transportation, the medium may be inclined with respect to the transportation direction of the medium transported along the transportation path. According to the foregoing configuration, the plurality of electrodes are arranged in the foregoing width direction. Therefore, the estimated value of the inclination of the medium can be calculated based on the time when the medium is detected by the first electrode and the time when the medium is detected by the second electrode.

(E) In the medium transporting apparatus, the electrode may include a third electrode installed between the first electrode and the second electrode in the width direction, and the charge detecting circuit may include an electric charge detecting circuit that corresponds to the third electrode. The time when the magnitude of the signal output from the electric charge detecting circuit corresponding to the first electrode becomes equal to or larger than the detection determination value is a first time, the time when the magnitude of the signal output from the electric charge detecting circuit corresponding to the second electrode becomes equal to or larger than the detection determination value is a second time, and a time when a magnitude of a signal output from the electric charge detecting circuit corresponding to the third electrode becomes equal to or larger than the detection determination value is a third time. In this case, when a difference between the first time and the second time is equal to or smaller than a difference determination value, the controller calculates the estimated value of the inclination so that the estimated value is larger as a difference between the third time and any of the first time and the second time is larger.

According to the foregoing configuration, the accuracy of calculating the estimated value of the inclination of the medium can be improved by using the three electrodes arranged in the width direction.

(F) The medium transporting apparatus may include a controller that determines that the medium is in contact with the electrode when the medium is transported along the transportation path from upstream to downstream in the transportation direction and a magnitude of the signal output from the electric charge detecting circuit is equal to or larger than a detection determination value. In this case, the electrode may include a plurality of electrodes installed at different positions in the width direction of the medium transported along the transportation path, and the electric charge detecting circuit may include a plurality of electric charge detecting circuits corresponding to the plurality of electrodes. A detection determination value for an electrode that is among the plurality of electrodes and located far from the nip section in the width direction is smaller than a detection determination value for an electrode that is among the plurality of electrodes and located close to the nip section in the width direction.

The amount of electric charges adhering to a portion of the medium that is far from the nip section in the width direction is smaller than the amount of electric charges adhering to a portion of the medium that is close to the nip section in the width direction. According to the foregoing configuration, as the detection determination values for the electrodes, values based on positional relationships between the nip section and the electrodes in the width direction are set. Therefore, even when the medium contacts the electrode located at a position far from the nip section in the width direction, the medium can be detected.

(G) In the medium transporting apparatus, when the medium is transported along the transportation path from upstream to downstream in the transportation direction, a magnitude of a signal output from an electric charge detecting circuit that is among the plurality of electric charge detecting circuits and corresponds to one of two of the plurality of electrodes arranged adjacent to each other in the width direction is equal to or larger than the detection determination value, and a magnitude of a signal output from an electric charge detecting circuit that is among the plurality of electric charge detecting circuits and corresponds to another of the two of the plurality of electrodes is smaller than the detection determination value, the controller may determine that a side end of the medium is located between the two electrodes in the width direction.

According to the foregoing configuration, the side end of the medium or a dimension of the medium in the width direction can be estimated by installing the plurality of electrodes in the width direction.

(H) According to another aspect, an image reading apparatus includes the foregoing medium transporting apparatus and a reader that reads an image of the medium transported along the transportation path. According to the foregoing configuration, the medium transported along the transportation path can be detected.

(I) In the image reading apparatus, the reader may be installed downstream of the electrode on the transportation path.

According to the foregoing configuration, before the reading of the image of the medium is started by the reader, the medium transported along the transportation path can be detected.

(J) According to still another aspect, an image reading apparatus includes the foregoing medium transporting apparatus and a reader that reads an image of the medium transported along the transportation direction. In this case, when an estimated value of the inclination is equal to or larger than an inclination determination value, the controller cancels transportation of the medium. According to this configuration, the medium can be protected.

(K) In the image reading apparatus, the controller may set the inclination determination value so that the inclination determination value is larger as a dimension of the medium transported along the transportation path in a width direction of the medium is smaller.

When a medium with a large dimension in the width direction is inclined and the inclination of the medium is small, a portion of the medium that deviates from the transportation path tends to be large. On the other hand, when a medium with a small dimension in the width direction is inclined and the inclination of the medium is large, a portion of the medium that deviates from the transportation path does not tend to be large. According to the foregoing configuration, as the dimension of the medium in the width direction is smaller, the inclination determination value is larger. Therefore, when the medium with the small dimension in the width direction is transported, the transportation of the medium is hardly canceled.

(L) A method for detecting a medium by a medium transporting apparatus including a feeding roller that rotates to transport a medium along a transportation path, an electrode installed downstream of the feeding roller on the transportation path and having conductivity, and an electric charge detecting circuit that outputs a signal having a magnitude corresponding to an amount of an electric charge, which moves from the medium to the electrode after the medium being transported along the transportation path comes into contact with the electrode. The method includes causing a controller of the medium transporting apparatus to determine that the medium is in contact with the electrode when the medium is transported along the transportation path from upstream to downstream in a transportation direction and a magnitude of the signal output from the electric charge detecting circuit is equal to or larger than a detection determination value. According to this configuration, effects that are the same as or equivalent to those obtained by the medium transporting apparatus can be obtained.

What is claimed is:

1. A medium transporting apparatus that transports a medium along a transportation path, comprising:
   a feeding roller that rotates to transport the medium;
   an electrostatic detection sensor, the electrostatic detection sensor including:
   at least one conductive electrode installed downstream of the feeding roller on the transportation path; and
   at least one electric charge detecting circuit that outputs a signal having a magnitude corresponding to an amount of an electric charge, which moves from the medium to the electrode after the medium being transported along the transportation path comes into contact with the electrode; and
   a controller that determines that the medium is in contact with the electrode when the medium is transported along the transportation path from upstream to downstream in a transportation direction and a magnitude of the signal output from the electric charge detecting circuit is equal to or larger than a detection determination value.

2. The medium transporting apparatus according to claim 1, further comprising
   a nip section that nips the medium together with the feeding roller, wherein
   the electrode is installed downstream of the nip section on the transportation path.

3. The medium transporting apparatus according to claim 2, further comprising
   a controller that determines that the medium is in contact with the electrode when the medium is transported along the transportation path from upstream to downstream in a transportation direction and a magnitude of the signal output from the electric charge detecting circuit is equal to or larger than a detection determination value, wherein the at least one electrode includes a plurality of electrodes installed at different positions in a width direction of the medium transported along the transportation path, the at least one electric charge detecting circuit includes a plurality of electric charge detecting circuits corresponding to the plurality of electrodes, and a detection determination value for an electrode that is among the plurality of electrodes and located far from the nip section in the width direction is smaller than a detection determination value for an electrode that is among the plurality of electrodes and located close to the nip section in the width direction.

4. The medium transporting apparatus according to claim 1, wherein the at least one electrode includes a plurality of electrodes installed at different positions in a width direction of the medium transported along the transportation path, the at least one electric charge detecting circuit includes a plurality of electric charge detecting circuits corresponding to the plurality of electrodes, and the controller calculates an estimated value of an inclination of the medium so that the estimated value is larger as a difference between a time when a magnitude of a signal output from an electric charge detecting circuit that is among the plurality of electric charge detecting circuits and corresponds to a first electrode among the plurality of electrodes becomes equal to or larger than the detection determination value and a time when a magnitude of a signal output from an electric charge detecting circuit that is among the plurality of electric charge detecting circuits and corresponds to a second electrode among the plurality of electrodes becomes equal to or larger than the detection determination value is larger.

5. The medium transporting apparatus according to claim 4, wherein the plurality of electrodes includes a third electrode installed between the first electrode and the second electrode in the width direction, the plurality of electric charge detecting circuits includes an electric charge detecting circuit corresponding to the third electrode, and when the time when the magnitude of the signal output from the electric charge detecting circuit corresponding to the first electrode becomes equal to or larger than the detection determination value is a first time, the time when the magnitude of the signal output from the electric charge detecting circuit corresponding to the second electrode becomes equal to or larger than the detection determination value is a second time, a time when a magnitude of a signal output from the electric charge detecting circuit corresponding to the third electrode becomes equal to or larger than the detection determination value is a third time, and a difference between the first time and the second time is equal to or smaller than a difference determination value, the controller calculates the estimated value of the inclination so that the estimated value is larger as a difference between the third time and any of the first time and the second time is larger.

6. The medium transporting apparatus according to claim 4, wherein when the medium is transported along the transportation path from upstream to downstream in the transportation direction, a magnitude of a signal output from an electric charge detecting circuit that is among the plurality of electric charge detecting circuits and corresponds to one of two of the plurality of electrodes arranged adjacent to each other in the width direction is equal to or larger than the detection determination value, and a magnitude of a signal output from an electric charge detecting circuit that is among the plurality of electric charge detecting circuits and corresponds to another of the two of the plurality of electrodes is smaller than the detection determination value, the controller determines that a side end of the medium is located between the two of the plurality of electrodes in the width direction.

7. An image reading apparatus comprising:

the medium transporting apparatus according to claim 4; and a reader that reads an image of the medium transported along the transportation path, wherein the controller cancels transportation of the medium when the estimated value of the inclination is equal to or larger than an inclination determination value.

8. The image reading apparatus according to claim 7, wherein the controller sets the inclination determination value so that the inclination determination value is larger as a dimension of the medium transported along the transportation path in the width direction is smaller.

9. An image reading apparatus comprising:

the medium transporting apparatus according to claim 1; and a reader that reads an image of the medium transported along the transportation path.

10. The image reading apparatus according to claim 9, wherein the reader is installed downstream of the electrode on the transportation path.

11. A method for detecting a medium by a medium transporting apparatus including a feeding roller that rotates to transport the medium along a transportation path, and an electrostatic detection sensor, the electrostatic detection sensor including a conductive electrode installed downstream of the feeding roller on the transportation path, and the electrostatic detection sensor further including an electric charge detecting circuit that outputs a signal having a magnitude corresponding to an amount of an electric charge, which moves from the medium to the electrode after the medium being transported along the transportation path comes into contact with the electrode, the method comprising:

causing a controller of the medium transporting apparatus to determine that the medium is in contact with the electrode when the medium is transported along the transportation path from upstream to downstream in a transportation direction and a magnitude of a signal output from the electric charge detecting circuit is equal to or larger than a detection determination value.

* * * * *